(12) United States Patent
Kang et al.

(10) Patent No.: US 11,616,946 B2
(45) Date of Patent: Mar. 28, 2023

(54) IMAGE ENCODING/DECODING METHOD, DEVICE, AND RECORDING MEDIUM HAVING BITSTREAM STORED THEREIN

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR); Gwang Hoon Park, Seongnam-si (KR); Tae Hyun Kim, Hwaseong-si (KR); Dae Young Lee, Ansan-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

(*) Notice: Subject to any disclaimer, the term of this patent is extended or adjusted under 35 U.S.C. 154(b) by 0 days.

(21) Appl. No.: 17/278,212

(22) PCT Filed: Sep. 20, 2019

(86) PCT No.: PCT/KR2019/012280
§ 371 (c)(1),
(2) Date: Mar. 19, 2021

(87) PCT Pub. No.: WO2020/060319
PCT Pub. Date: Mar. 26, 2020

(65) Prior Publication Data
US 2021/0352274 A1  Nov. 11, 2021

(30) Foreign Application Priority Data

Sep. 21, 2018  (KR) .................. 10-2018-0114310

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/423* (2014.11); *H04N 19/46* (2014.11); *H04N 19/51* (2014.11)

(58) Field of Classification Search
None
See application file for complete search history.

(56) References Cited

U.S. PATENT DOCUMENTS

2014/0219356 A1  8/2014  Nishitani et al.
2017/0188028 A1  6/2017  Park et al.
(Continued)

FOREIGN PATENT DOCUMENTS

KR           100772576 B1     11/2007
KR       1020120011886 A      2/2012
(Continued)

OTHER PUBLICATIONS

Li Zhang et al., CE4-related: History-based Motion Vector Prediction, Joint Video Experts Team (JVET) of ITU-T SG 16 WP 3 and ISO/IEC JTC 1/SC 29/WG 11, JVET-K0104-v5, 11th Meeting: Ljubljana, SI, Jul. 10-18, 2018, Bytedance Inc.

*Primary Examiner* — Christopher G Findley
(74) *Attorney, Agent, or Firm* — William Park & Associates Ltd.

(57) ABSTRACT

An image decoding method is disclosed in the present specification. An image decoding method according to the present invention may comprise deriving a candidate list for (Continued)

inter-prediction of a current block, deriving motion information of the current block by using the candidate list, deriving a cumulative coding information candidate by using the motion information of the current block, inserting the derived cumulative coding information candidate into a cumulative coding information candidate list and updating the candidate list by using the cumulative coding information candidate list, wherein the updated candidate list is used for inter-prediction of a block to be decoded after the current block.

19 Claims, 20 Drawing Sheets

(51) Int. Cl.
*H04N 19/423* (2014.01)
*H04N 19/46* (2014.01)
*H04N 19/51* (2014.01)

(56) References Cited

U.S. PATENT DOCUMENTS

2020/0036997 A1\* 1/2020 Li .................... H04N 19/436
2021/0136405 A1\* 5/2021 Chen ................ H04N 19/184

FOREIGN PATENT DOCUMENTS

| KR | 1020180057564 A | 5/2018 |
|----|----|----|
| WO | 0186962 A1 | 11/2001 |
| WO | 2010129883 A1 | 11/2010 |

\* cited by examiner (a)

| | Descriptor |
|---|---|
| coding_unit( x0, y0, cbWidth, cbHeight ) { | |
|   if( slice_type != I ) { | |
|     pred_mode_flag | ae(v) |
|   } | |
|   if( CuPredMode[ x0 ][ y0 ] == MODE_INTRA ) { | |
|     ... | |
|     pred_intra_mode_type_idx | ae(v) |
|     if(pred_intra_mode_type_idx == MODE_INTRA_PRED_BUFFER ) { | |
|       intra_pred_buffer_cand_idx | ae(v) |
|     } | |
|     ... | |
|   } else { | |
|     ... | |
|     pred_inter_mode_type_idx | ae(v) |
|     if(pred_inter_mode_type_idx == MODE_INTER_PRED_BUFFER ) { | |
|       inter_pred_buffer_cand_idx | ae(v) |
|     } | |
|     ... | |
|   } | |
|   ... | |
| } | |

IMAGE ENCODING/DECODING METHOD, DEVICE, AND RECORDING MEDIUM HAVING BITSTREAM STORED THEREIN

TECHNICAL FIELD

The present invention relates to a method and an apparatus for encoding/decoding an image, and a recording medium for storing a bitstream. More particularly, the present invention relates to a method and an apparatus for encoding/decoding an image on the basis of a coding information buffer and a candidate list, and a recording medium for storing a bitstream.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

DISCLOSURE

Technical Problem

An objective of the present invention is to provide an image encoding/decoding method and apparatus capable of improving compression efficiency, and a recording medium in which a bitstream generated by the method or apparatus is stored.

Another objective of the present invention is to provide an image encoding/decoding method and apparatus capable of improving compression efficiency by using a coding information buffer and a recording medium in which a bitstream generated by the method or apparatus is stored.

Another objective of the present invention is to provide an image encoding/decoding method and apparatus capable of improving compression efficiency by using candidate list and a recording medium in which a bitstream generated by the method or apparatus is stored.

Technical Solution

According to the present invention, image decoding method comprises deriving a candidate list for inter-prediction of a current block, deriving motion information of the current block by using the candidate list, deriving a cumulative coding information candidate by using the motion information of the current block, inserting the derived cumulative coding information candidate into a cumulative coding information candidate list and updating the candidate list by using the cumulative coding information candidate list, wherein the updated candidate list is used for inter-prediction of a block to be decoded after the current block.

Wherein the cumulative coding information candidate list contains motion information of a block that is previously encoded before the current block.

Wherein when the current block is not included in an area for which the cumulative coding information candidate list is generated, a cumulative coding information candidate derived by using the motion information of the current block is not inserted into the cumulative coding information candidate list.

Wherein the area for which the cumulative coding information candidate list is set on a per CTU row basis.

Wherein the number of candidates that can be inserted into the candidate list is a preset value.

Wherein the inserting of the derived cumulative coding information candidate into the cumulative coding information candidate list comprises, deleting the candidate that is inserted earliest into the cumulative coding information candidate list among candidates in the cumulative coding information candidate list, when the number of candidates in the candidate list is the preset value and inserting the derived cumulative coding information candidate in a position next to a candidate that is inserted last into the cumulative coding information candidate list.

Wherein the updating of the candidate list by using the cumulative coding information candidate list includes: inserting at least one of the candidates included in the cumulative coding information candidate list into the candidate list.

Wherein the candidates included in the cumulative coding information candidate list are inserted into the candidate list after a spatial candidate or a temporal candidate is inserted into the candidate list.

Wherein the candidate list is at least one candidate list selected from among a merge candidate list and an AMVP motion vector candidate list.

According to the present invention, an image encoding method comprises deriving a cumulative coding information candidate by using motion information of a current block, inserting the derived cumulative coding information candidate into a cumulative coding information candidate list and deriving a candidate list by using the cumulative coding information candidate list, wherein the derived candidate list is used for inter-prediction of a block to be encoded after the current block.

Wherein the cumulative coding information candidate list contains motion information of a block that is previously encoded before the current block.

Wherein when the current block is not included in an area for which the cumulative coding information candidate list is generated, a cumulative coding information candidate derived by using the motion information of the current block is not inserted into the cumulative coding information candidate list.

Wherein the area for which the cumulative coding information candidate list is generated is set on a per CTU basis.

Wherein the number of candidates that can be inserted into the candidate list is a preset value.

Wherein the inserting of the derived cumulative coding information candidate into the cumulative coding information candidate list includes, deleting the candidate that is inserted earliest into the cumulative coding information candidate list among candidates in the cumulative coding information candidate list; and inserting the derived cumulative coding information candidate in a position next to a candidate that is inserted last into the cumulative coding information candidate list.

Wherein the driving of the candidate list by using the cumulative coding information candidate list includes, inserting at least one of the candidates included in the cumulative coding information candidate list into the candidate list.

Wherein the candidates in the cumulative coding information candidate list are inserted into the candidate list after a spatial candidate or a temporal candidate is inserted into the candidate list.

Wherein the candidate list is either a merge candidate list or an AMVP motion vector candidate list.

According to a present invention, a computer-readable recording medium in which a bitstream is stored, the bitstream being received by an image decoding apparatus and being used to reconstruct a current block included in a current picture, wherein the bitstream contains inter-prediction information of the current block, the inter-prediction information is used to derive a candidate list used for prediction of the current block, the candidate list is used to derive the motion information of the current block, the motion information of the current block is used to derive a cumulative coding information candidate, the cumulative coding information candidate is used to derive a cumulative coding information candidate list, the cumulative coding information candidate list is used to update the candidate list, and the updated candidate list is used for inter-prediction of a block to be decoded after the current block.

Advantageous Effects

According to the present invention, it is possible to provide an image encoding/decoding method and apparatus capable of improving compression efficiency and to provide a recording medium in which a bitstream generated by the method or apparatus is stored.

In addition, according to the present invention, it is possible to provide an image encoding/decoding method and apparatus capable of improving compression efficiency by using coding information buffer and a recording medium in which a bitstream generated by the method or apparatus is stored.

In addition, according to the present invention, it is possible to provide an image encoding/decoding method and apparatus capable of improving compression efficiency by using candidate list and a recording medium in which a bitstream generated by the method or apparatus is stored.

DESCRIPTION OF DRAWINGS

FIG. 19 is a diagram illustrating a syntax structure according to a yet further embodiment of the present invention.

BEST MODE

Figure 1:
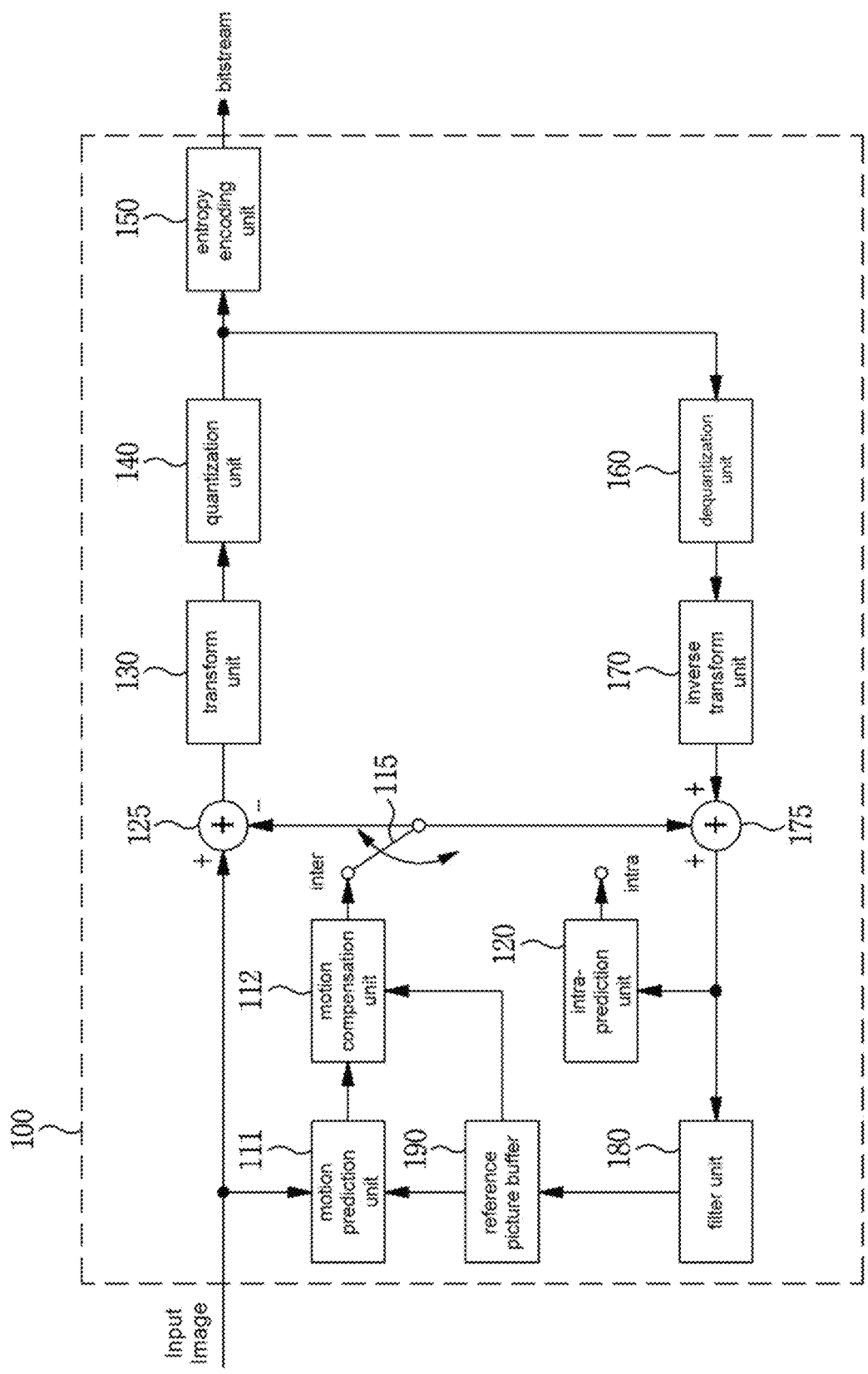
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd-1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

The adaptation parameter set refers to a parameter set that can be shared and referred to by different pictures, subpictures, slices, tile groups, tiles, or bricks. In addition, sub-pictures, slices, tile groups, tiles, or bricks in a picture may refer to different adaptation parameter sets to use information in the different adaptation parameter sets.

Regarding the adaptation parameter sets, sub-pictures, slices, tile groups, tiles, or bricks in a picture may refer to different adaptation parameter sets by using identifiers of the respective adaptation parameter sets.

Regarding the adaptation parameter sets, slices, tile groups, tiles, or bricks in a sub-picture may refer to different adaptation parameter sets by using identifiers of the respective adaptation parameter sets.

Regarding the adaptation parameter sets, tiles or bricks in a slice may refer to different adaptation parameter sets by using identifiers of the respective adaptation parameter sets.

Regarding the adaptation parameter sets, bricks in a tile may refer to different adaptation parameter sets by using identifiers of the respective adaptation parameter sets.

The parameter set or header of a sub-picture may include information on an adaptation parameter set identifier. Thus, an adaptation parameter set corresponding to the adaptation parameter set identifier may be used in the sub-picture.

The parameter set or header of a tile may include an adaption parameter set identifier so that an adaption parameter set corresponding to the adaption parameter set identifier may be used in the tile.

The header of a brick may include information on an adaptation parameter set identifier so that an adaptation parameter set corresponding to the adaptation parameter set identifier may be used in the brick.

The picture may be split into one or more tile rows and one or more tile columns.

The sub-picture in a picture may be split into one or more tile rows and one or more tile columns. The sub-picture may be a rectangular or square region in a picture and may include one or more CTUs. The sub-picture may include at least one tile, brick, and/or slice.

The tile may be a rectangular or square region in a picture and may include one or more CTUs. The tile may be split into one or more bricks.

The brick may refer to one or more CTU rows in a tile. The tile may be split into one or more bricks, and each brick may have at least one CTU row. A tile that is not split into two or more bricks may also mean a brick.

The slice may include one or more tiles in a picture and may include one or more bricks in a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
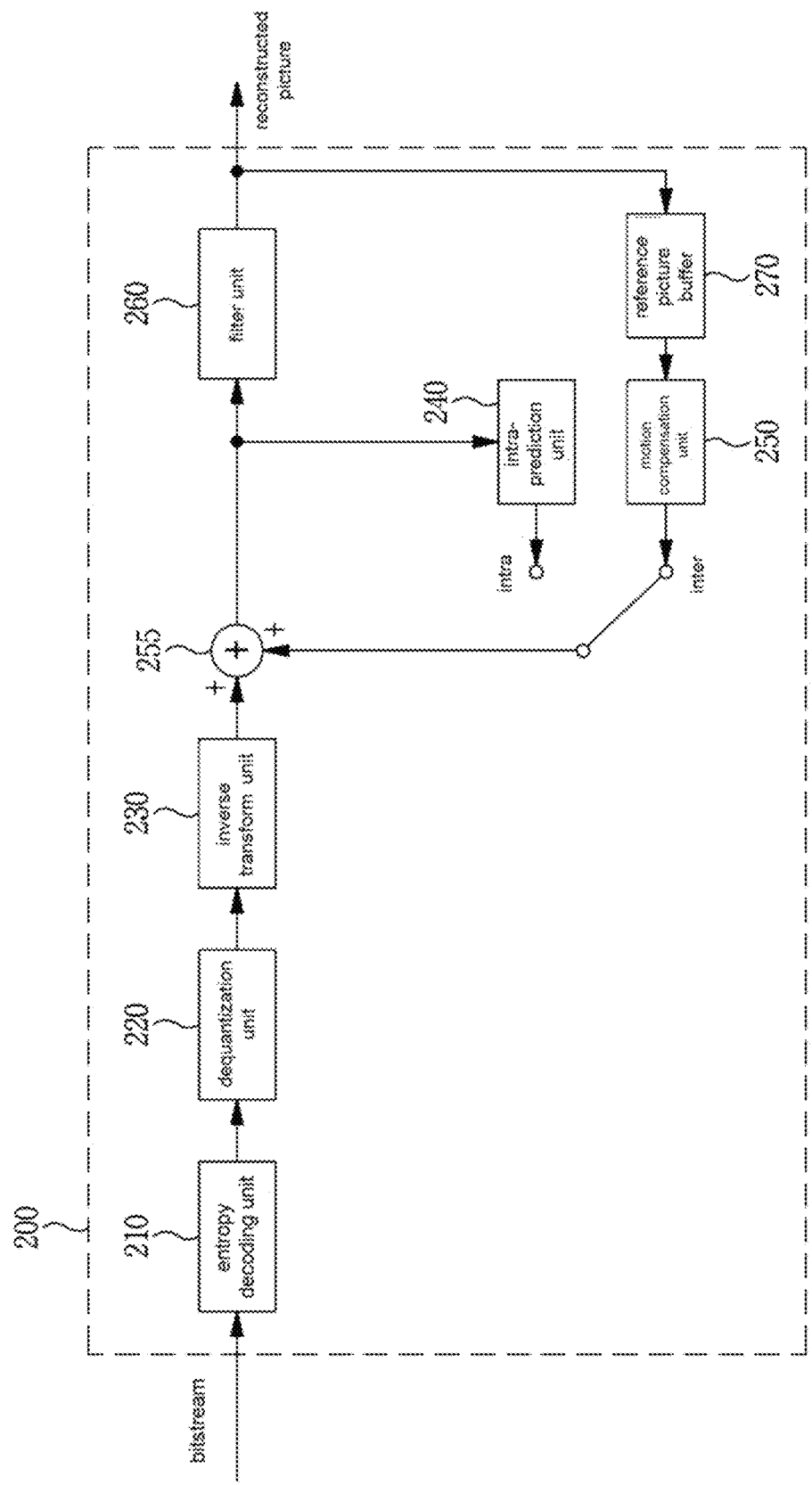
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image.

The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
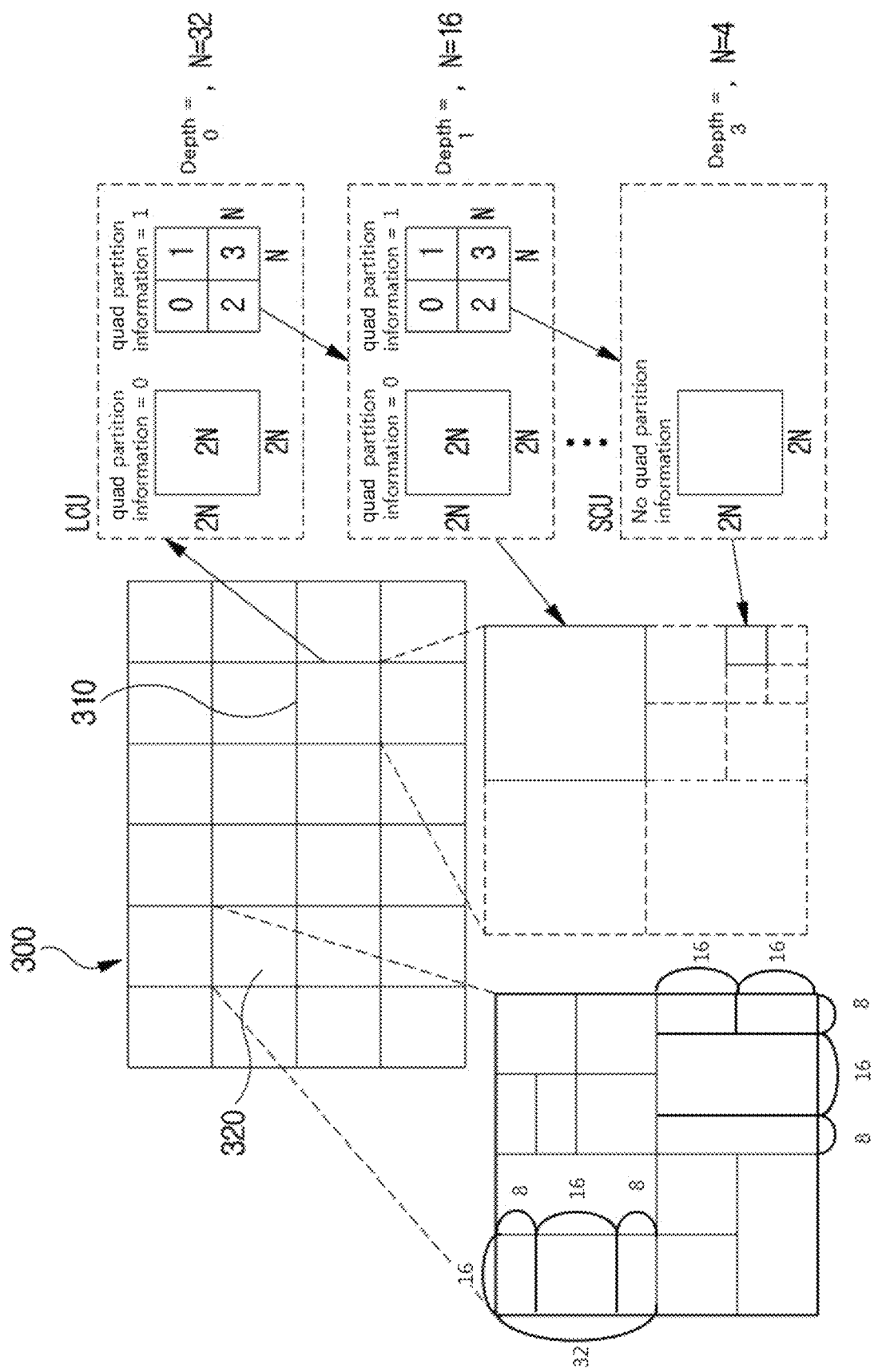
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or pre-defined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
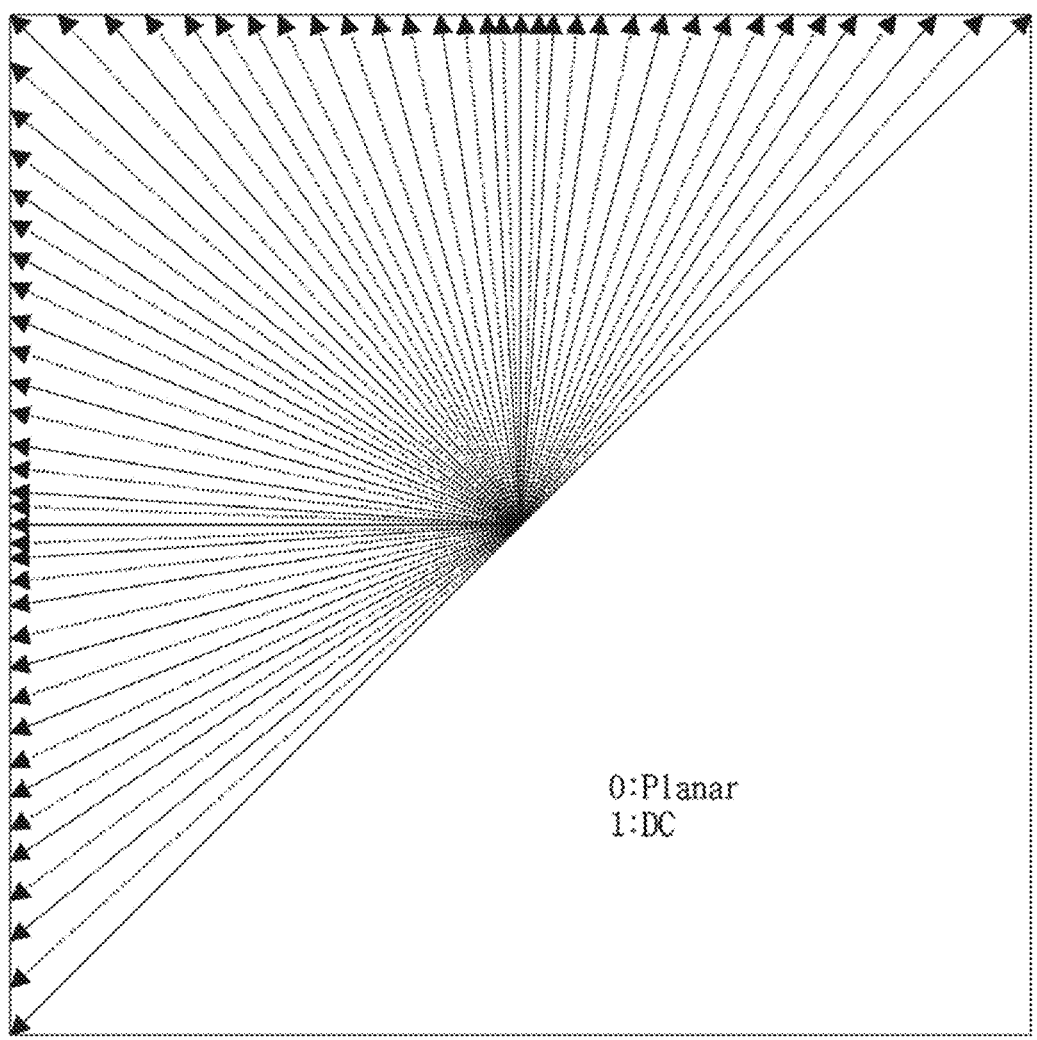
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc.

Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
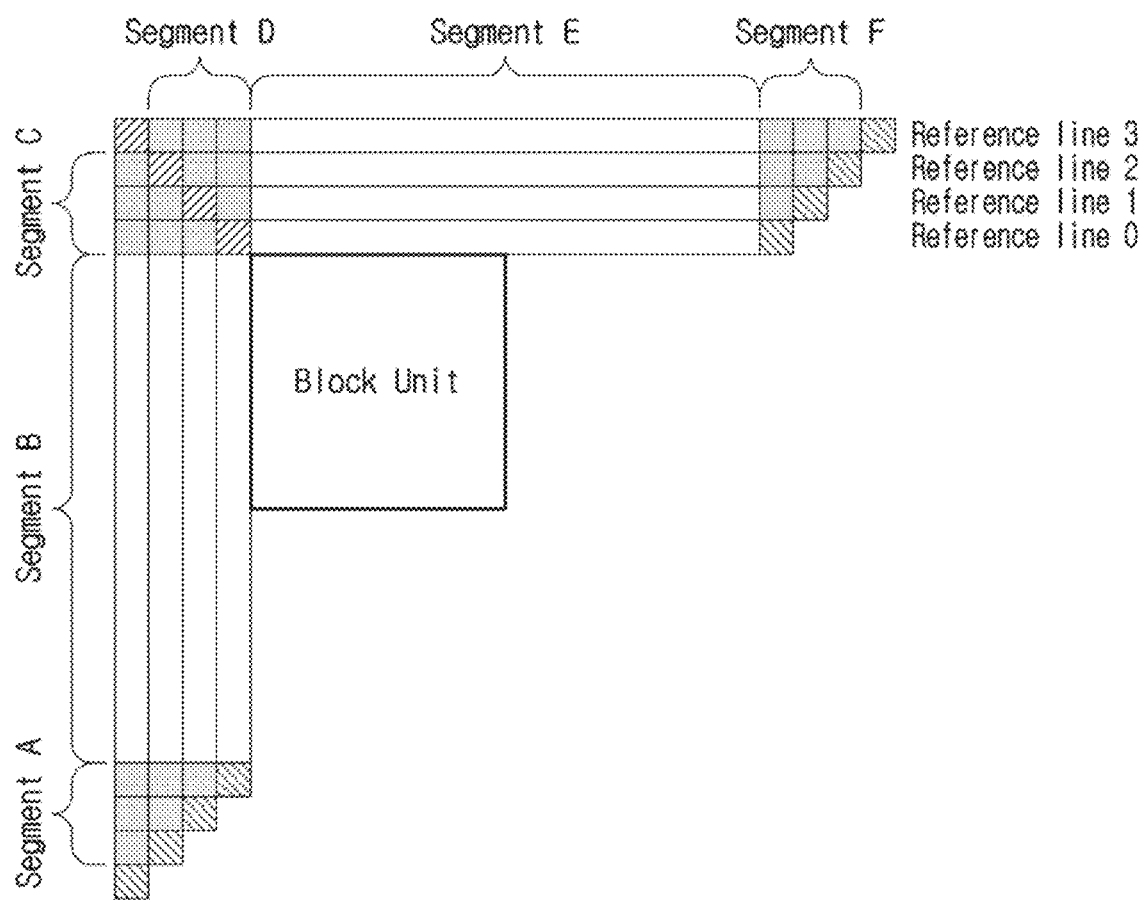
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
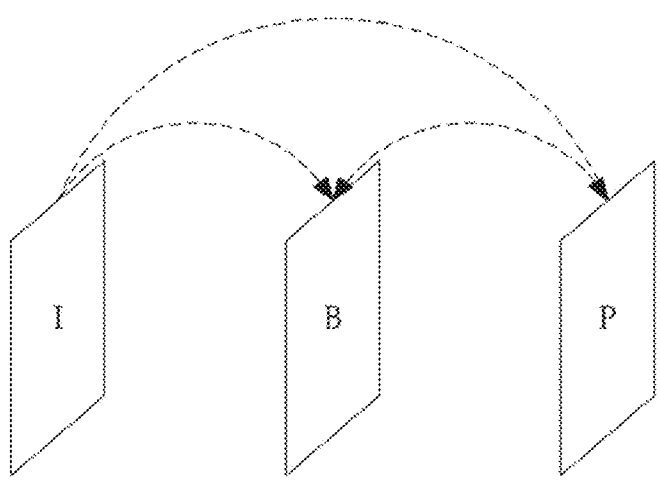
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
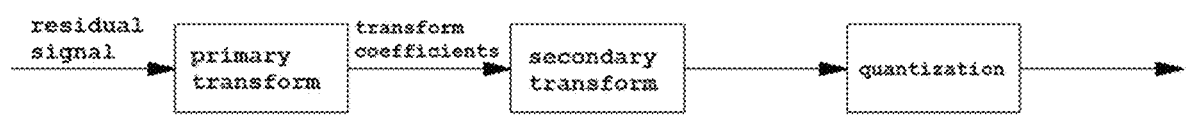
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to MxN (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image encoding/decoding method using a candidate list, according to embodiments of the present invention, will be described in detail.

Images can be encoded/decoded according to at least one or at least one combination of the embodiments described below. It is possible to improve the encoding efficiency of an encoder and the decoding efficiency of a decoder by efficiently determining a reference block for a current block in the process of encoding/decoding images according to the embodiments described below.

Figure 8:
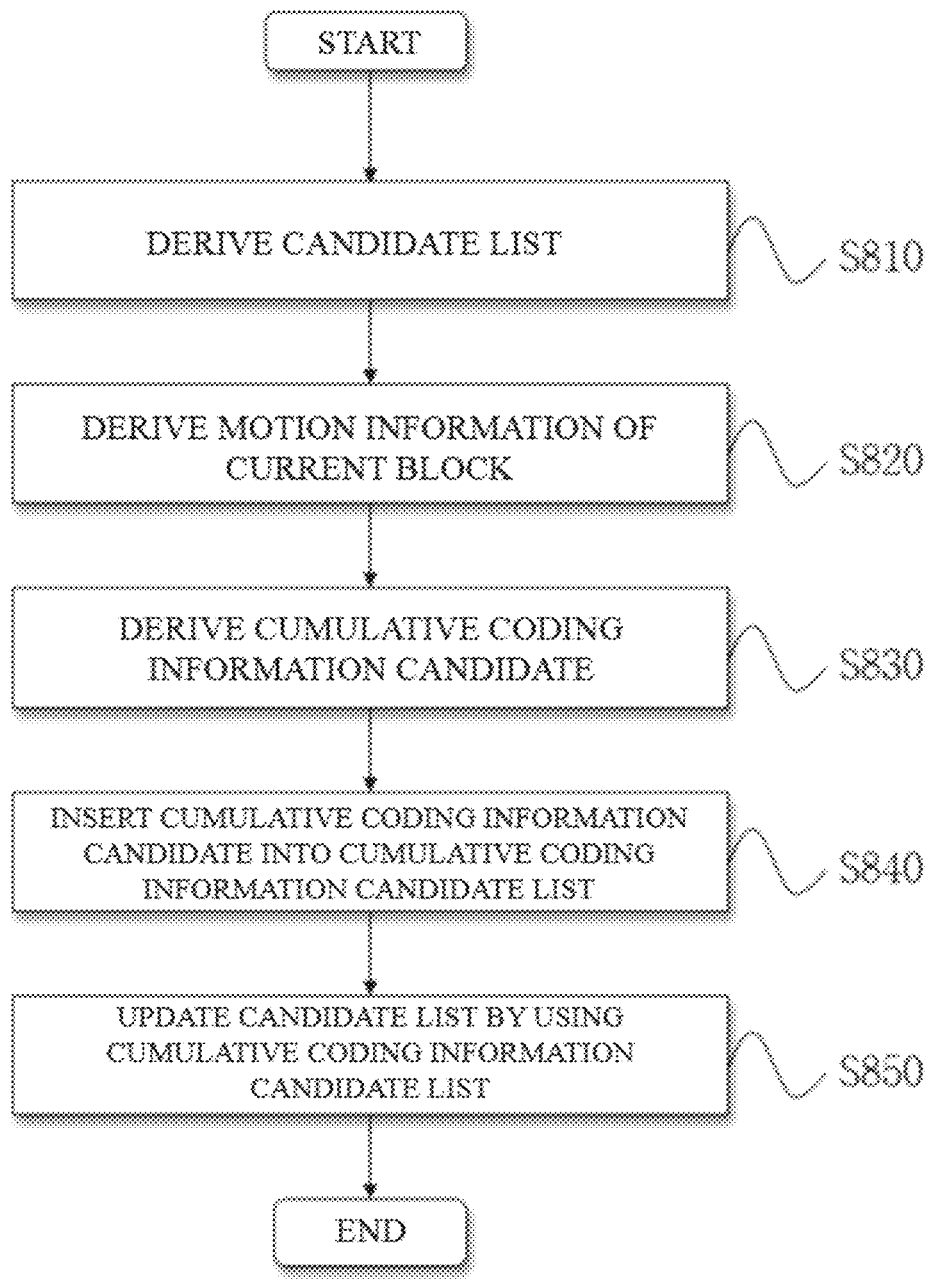
FIG. 8 is a flowchart illustrating an image decoding method according to one embodiment of the present invention.
Figure 9:
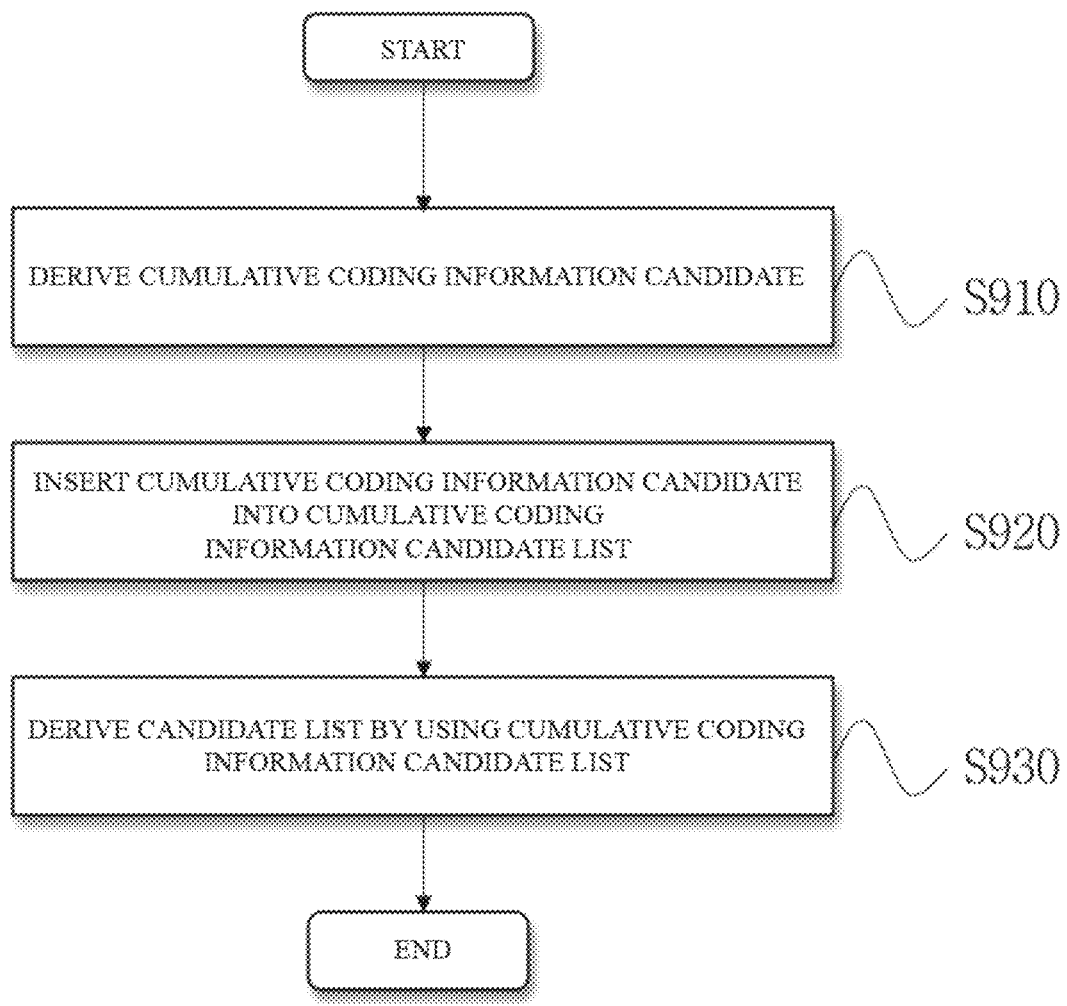
FIG. 9 is a flowchart illustrating an image encoding method according to one embodiment of the present invention.

FIG. 8 is a flowchart illustrating an image decoding method according to one embodiment of the present invention, and FIG. 9 is a flowchart illustrating an image encoding method according to one embodiment of the present invention.

Referring to FIG. 8, an image decoding method according to the present invention may include: Step S810 of deriving a candidate list to be used for inter-prediction of a current block; Step S820 of deriving motion information of the current block using the candidate list; Step S830 of deriving a cumulative coding information candidate using the motion information of the current block; Step S840 of inserting the cumulative coding information candidate into a cumulative information candidate list; and a step of updating the candidate list using the cumulative coding information candidate list.

In this case, the candidate list (i.e., list of candidates) updated in Step S850 may be used for inter-prediction of the next block that is to be subsequently decoded after the decoding of the current block.

Referring to FIG. 9, an image encoding method according to the invention may include: Step S910 of deriving cumulative coding candidates from motion information of the current block; Step S920 of inserting the cumulative coding information candidates into a cumulative coding information candidate list; and Step S930 of deriving a candidate list with the use of the cumulative coding information candidate list.

The candidate list derived in Step S930 may be used for inter-prediction of the next block that is to be subsequently encoded after the encoding of the current block.

The further details of FIGS. 8 and 9 will be described below.

Usage of memory resources can be reduced by avoiding storing duplicate information during encoding/decoding of past blocks when storing coding information that is likely to be referred to for encoding/decoding of the current block and future blocks.

In the following description, a block that is being encoded or decoded at the present time is defined as a current block. In addition, a block that will be encoded or decoded after the current block is encoded/decoded is defined as a future block. For example, a future block means a block that is to be subsequently encoded or decoded after the current block is encoded or decoded.

Adjacent blocks often have similar or identical coding information. When coding information is stored on a per sub-block basis for ease of reference, there may be multiple sub-blocks using the identical coding information. Therefore, there is a possibility that multiple pieces of duplicate coding information may be present in a buffer that stores the coding information. The present invention has the effect of saving memory resources by excluding redundant coding information.

A buffer to store coding information (hereinafter, referred to as coding information buffer) may store coding information when coding information that can be used in the process of encoding the current and future blocks occurs. The coding information may be generated in the process of encoding/decoding a block. The basic unit per which the coding information is generated may be a block or a sub-block. That is, the coding information may be generated in units of a block or a sub-block. The coding information buffer may store the coding information per specific unit or the coding information per a certain block size (e.g. a 4×4 block, an 8×8 block, or a 16×16 block).

The coding information according to the present invention is a collective term for information that is used to encode/decode a current picture. In addition, the coding information may refer to information used to encode/decode a specific area in the following description. Depending on the area to be encoded/decoded, the coding information may be expressed as block information. For example, block information may include, but may not be limited to, at least type of information selected from among partition information, size information, inter-prediction information, intra-prediction information, transform information, and filtering information. In other words, in the following description, the coding information or the block information refers to information that can be used to encode or decode a current block or a future block, and it may include both the information that is signaled from an encoder to a decoder and the information set in the encoder or in the decoder.

For example, the coding information to be stored in the coding information buffer may be limited to the coding information that can be used for current and future predictions, and the stored information that is no longer used for current and future predictions may be removed from the coding information buffer in some embodiments described below.

The coding information buffer according to the invention may be a term that refers to a list of candidates for the coding information that can be used during the encoding/decoding process.

Figure 10:
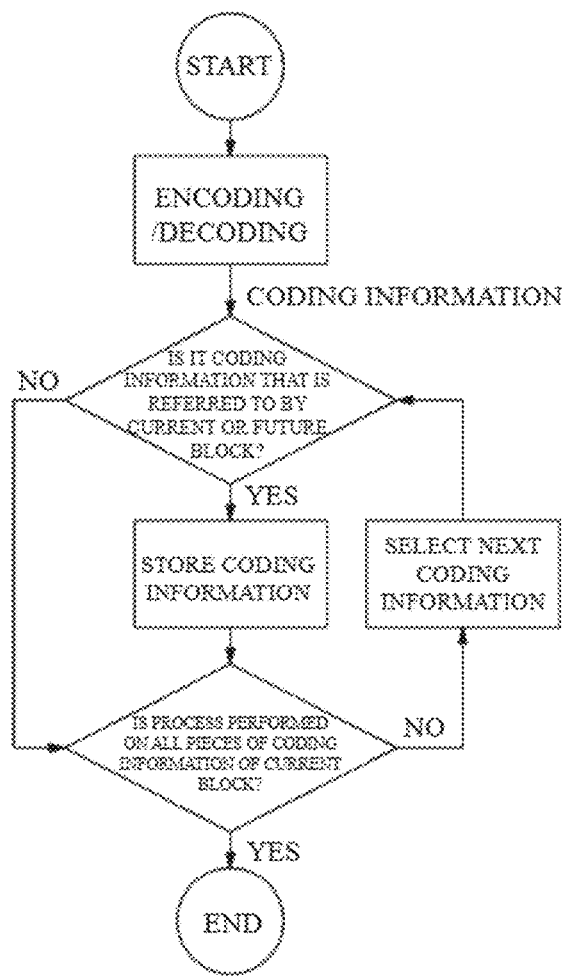
FIG. 10 is a flowchart illustrating a method of storing coding information according to one embodiment of the present invention.
Figure 10:
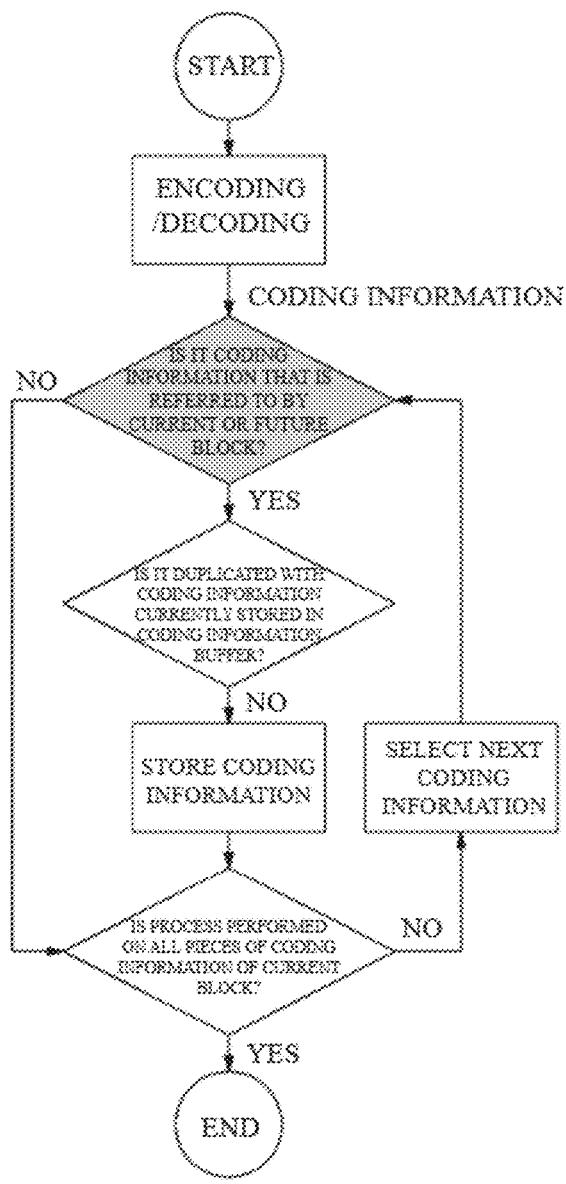

FIG. 10 is a flowchart illustrating a method of storing coding information according to one embodiment of the present invention.

FIG. 10A illustrates an example of a method in which an encoder/decoder stores coding information. The encoding/decoding step may be the process of encoding/decoding the current block with the use of the reconstructed coding information. Information that is used to reconstruct the current block may be derived as a result of the encoding/decoding process. The derived information may be used in the encoding/decoding of the following block. When there is a possibility that the derived information is referred to in the process of encoding/decoding the current or future block, the derived information may be stored in the coding information buffer through a coding information storing step. On the other hand, when there is no possibility that the derived information is referred to in the process of encoding/decoding the present or future block, the derived information may not be stored in the coding information buffer.

As the coding information derived through the encoding/decoding step, a single piece of coding information or multiple pieces of coding information may be derived. When multiple pieces of coding information are derived, a step of determining whether all the pieces of the coding information of the current block generated during the encoding/decoding step need to be in the coding information buffer. Depending on the results of the determination, it may be further determined whether the corresponding coding information is stored or not. When the determination is not completed for all the pieces of the coding information, the encoder/decoder determines whether each of the remaining pieces of the coding information will be stored in the coding information buffer. Depending on the determination, each of the remaining pieces of the coding information may be stored or not stored in the coding information buffer.

FIG. 10(b) illustrates an example of a method in which an encoder/decoder stores coding information while eliminating redundancy of the coding information. In comparison with the flowchart of FIG. 10(a), the encoding/decoding method according to the present invention may include an additional step of determining whether the derived coding information is duplicated with the coding information currently stored in the coding information buffer. The encoder/decoder compares the newly derived coding information with the coding information currently stored in the coding information buffer. When the coding information is duplicated, the newly derived coding information may not be stored in the coding information buffer.

When the redundancy of the coding information is excluded, the determination of whether the derived information is the coding information to be referenced for the processing of the current or future block can be omitted depending on the encoding/decoding method and the method of referencing to the coding information. For example, when the encoding/decoding is performed on the current block according to how the coding information stored in the coding information buffer is referred to, regardless of the neighboring positions, no determination may be made as to whether the derived information is the coding information that is to be referred to for the processing of the current or future block. That is, in the flowchart of FIG. 10(b), the step of determining whether the generated coding information is coding information to be referenced in the current or future block may be omitted.

When the size of the coding information buffer is set to a fixed size in advance, at least one piece or some pieces of the coding information stored in the coding information buffer may be removed and one or more new pieces of coding information may be recorded in the coding information buffer, depending on the number of pieces of the coding information stored in the coding information buffer.

Figure 11:
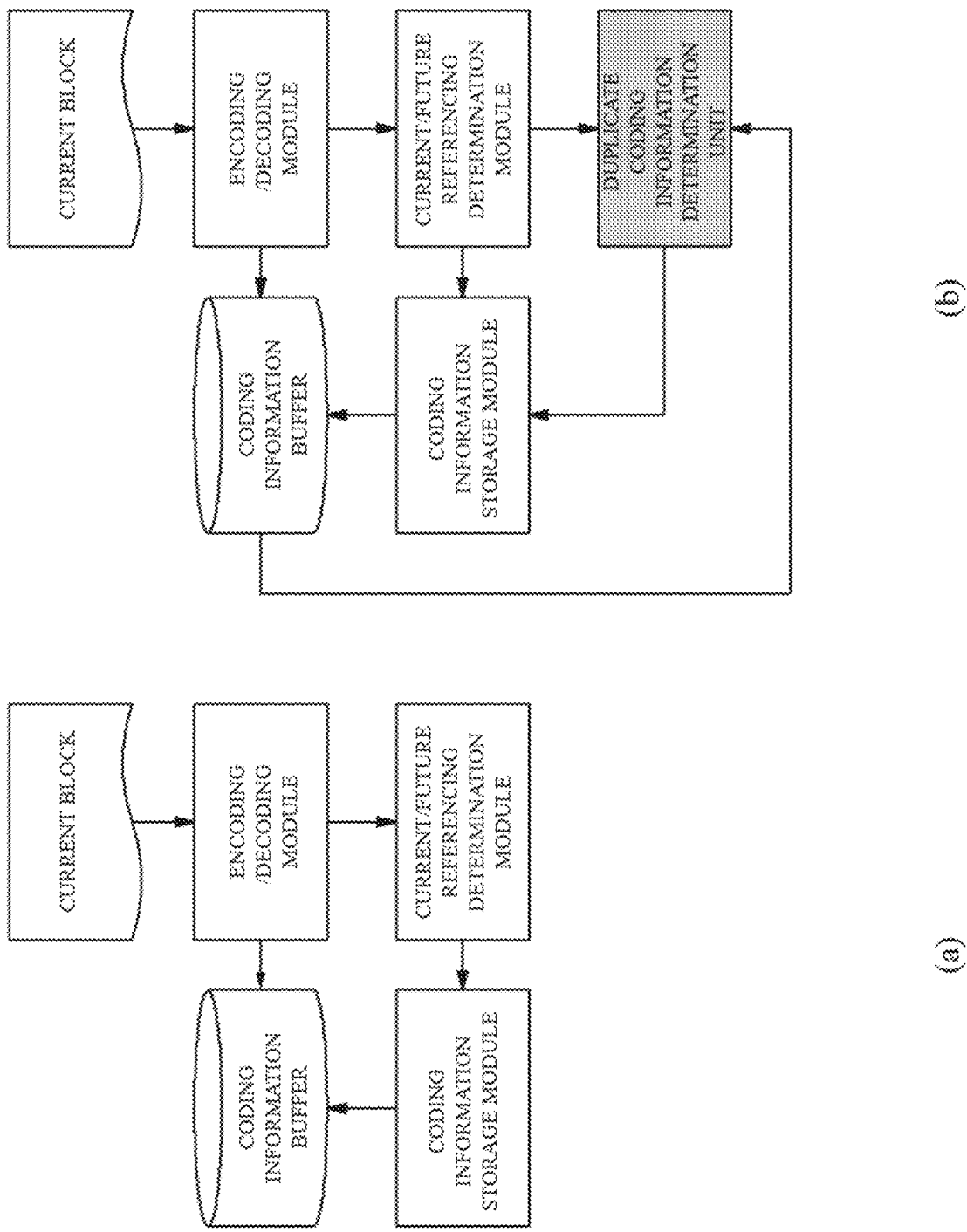
FIG. 11 is a diagram illustrating an apparatus for storing coding information according one embodiment of the present invention.

FIG. 11 is a diagram illustrating an apparatus for storing coding information according one embodiment of the present invention.

FIG. 11(a) shows an example of the construction of the encoder/decoder that stores coding information. A coding/decoding module may encode/decode the current block by referring to the coding information stored in the coding information buffer. The information required to reconstruct the current block may be derived through the operation of a prediction module, and this information may be used as the coding information for coding/decoding of the next block or future block. A current/future reference determination module may determine whether new coding information generated by the encoding/decoding module is coding information that is to be referred to for the processing of the current or future block. A coding information recording module records coding information in the coding information buffer when the coding information is determined to be information that will be referred to in the processing of the current or future block.

FIG. 11 (b) shows an example of the construction of an encoder/decoder in which the method of eliminating redundancy of coding information is used. The construction of the encoder/decoder in FIG. 11 (b) is similar to the construction of the encoder/decoder in FIG. 11(a) but differ in terms that the encoder/decoder in FIG. 11(b) additionally include a duplicate coding information determination module. The duplicate coding information determination module may compare the coding information currently stored in the coding information buffer and newly generated coding information to be recorded in the coding information buffer. When the coding information stored in the current encode buffer is identical to the newly generated coding information, the duplicate coding information determination module can prevent duplicate coding information from being recorded in the coding information buffer.

Hereinafter, an embodiment of the method in which the encoder/decoder prevents duplicate coding information from being recorded will be described.

Figure 12:
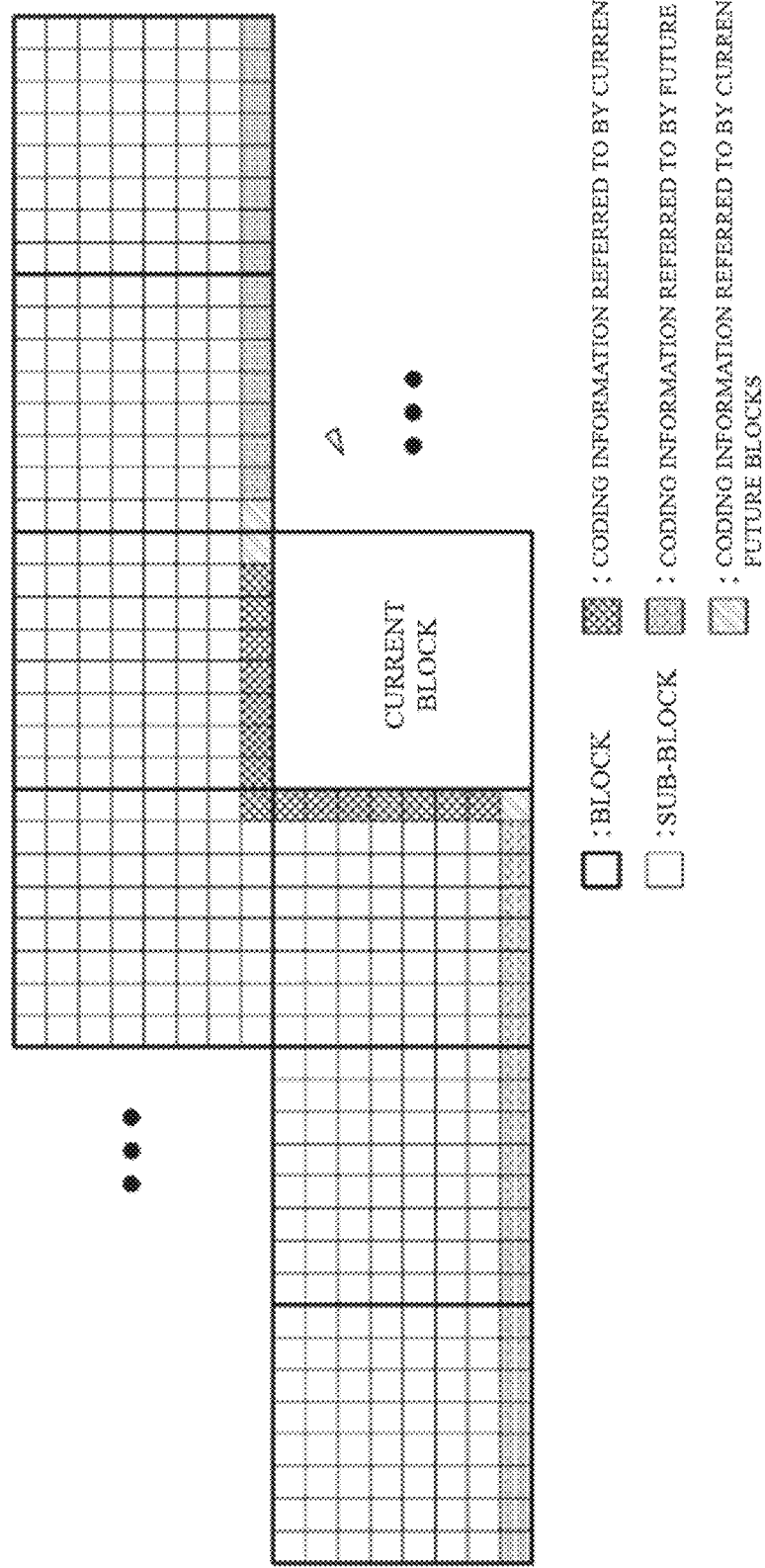
FIG. 12 is a diagram illustrating a coding information buffer according to an embodiment of the present invention.

FIG. 12 is a diagram illustrating a coding information buffer according to an embodiment of the present invention.

FIG. 12 shows an example of a coding information buffer that can be configured when the current block is encoded/decoded by referring to only the coding information of adjacent areas. The coding information generated in the case of the example in FIG. 12 may be recorded on a per sub-block basis, and the coding information of subblocks adjacent to the current block may be recorded in the coding information buffer. Thus, the coding information of each of the sub-blocks shown in FIG. 12 may be recorded in the coding information buffer. FIG. 12 shows coding information to be referred to in the processing of the current block, coding information to be referred to in the processing of a future block, and coding information to be referred to in the processing of the current and future blocks.

Figure 13:
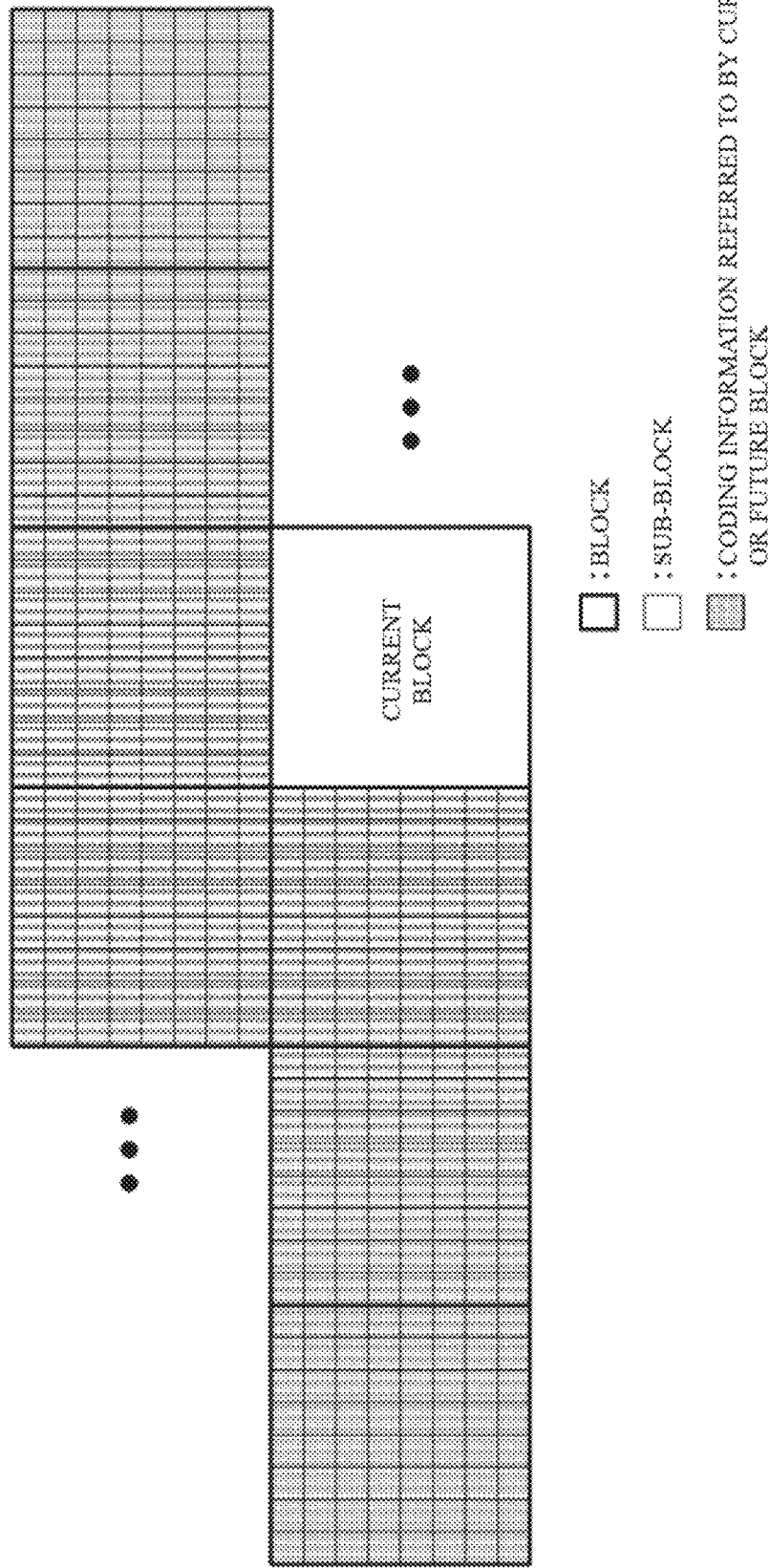
FIG. 13 is a diagram illustrating a coding information buffer according to another embodiment of the present invention.

FIG. 13 is a diagram illustrating a coding information buffer according to another embodiment of the present invention.

FIG. 13 shows an extended example of a reference area shown in FIG. 12. The coding information buffers according to the embodiments illustrated in FIGS. 12 and 13 stores coding information on many blocks, thereby consuming a large volume of memory.

In the embodiments illustrated in FIGS. 12 and 13, the illustrated area may mean an area composed of one or more blocks, such as a picture, a sub-picture, a slice, a tile, a brick, a CTU row, or a CTU column.

In the embodiments in FIGS. 12 and 13, a particular block can be divided into one or more smaller blocks (hereinafter, called child blocks). For example, when a particular block in FIG. 12 or 13 is a coding tree unit (CTU), the block (i.e., CTU) can be divided into one or more coding units (CUs).

In this case, a step for encoding/decoding, such as inter prediction, intra prediction, or transform encoding may be performed on a per block basis. When a block is divided into one or more smaller blocks (called child blocks) and encoding/decoding is performed on a per child block basis, the coding information of a child block including one or more pixels positioned directly above the bottom boundary of a block (i.e. parent block existing before the partition) may be recorded in the coding information buffer and may be used to encode/decode a block (parent block) on the next row or a child block resulting from the partitioning of the block.

For example, when a particular block (current block) is a CTU, the coding information of a CU or a sub-CU in which one or more pixels positioned directly above the bottom boundary of the current CTU are included may be recorded a line buffer-type coding information buffer, and the stored coding information may be used when encoding/decoding a CTU row that is next to the current CTU row. The coding information may include at least one type of information among position information, intra prediction coding mode, motion information (i.e., motion vector, reference picture index or identifier, reference picture list, etc.), and transformation scheme.

When the coding information buffer is created for an area around the top boundary of a particular row of blocks, since the size of the coding information buffer is proportional to the length of the particular row of blocks, the size of the coding information buffer may increase according to the length of the particular row of blocks. The length of a row of blocks may be determined at a particular level (an area), such as a picture, slice, tile, or brick, including one or more blocks. For example, when a particular block is a picture, the size of the coding information buffer may increase with the horizontal length of the picture.

The size of the coding information buffer may be closely related to the usage of memory resources. As the size of the coding information buffer increases, more memory resources are consumed. This may lead to an increase in the production cost of the encoder/decoder or a decrease in the performance of the encoder/decoder. Therefore, reducing the size of the coding information buffer is an important factor in implementing the encoder/decoder.

When the coding information of all blocks containing pixels positioned just above the bottom boundary of a block line is stored in the coding information buffer, there is a problem that there are many pieces of duplicate coding information stored in the coding information buffer. In this case, the size of the coding information buffer can be reduced by eliminating the redundancy of the coding information stored in the coding information buffer.

For example, when new coding information is generated and recorded in the coding information buffer, when the generated new coding information is identical to at least one piece of the coding information stored in the coding information buffer, the generated new coding information may not be recorded in the coding information buffer.

For example, by limiting the size of the coding information buffer, the encoder/decoder may determine whether the same number of pieces of the coding information as the maximum number of the coding information buffers are already stored. When a maximum number of pieces of the coding information are stored in the coding information buffers, the encoder/decoder may remove the oldest piece of coding information and add a new piece of coding information to the coding information buffer. In other words, according to one embodiment of the present invention, a first-in first-out (FIFO) coding information buffer may be used.

When FIFO coding information buffers are used, when old coding information stored in the coding information buffer is the same as new coding information to be newly recorded, the stored old coding information is removed, and the new coding information may be recorded in the coding information buffer. In this way, the redundancy of coding information which may occur in the coding buffer may be eliminated. Since the oldest coding information stored in the coding information buffer is removed or deleted and new coding information is recorded, the order in which the coding information is deleted in the FIFO structure may be changed.

When a method of eliminating redundancy, according to the present invention, is applied, a method of constructing a list of candidates to be referred to in the encoding/decoding step may be changed. For example, when the current block refers to a block positioned directly above the top boundary of a CTU, a specified number of pieces of coding information disposed at or around a specific position associated with an index, regardless of a specified reference location, may be referred to, and the coding information corresponding to the specified reference location may be replaced. In this case, a method of referring to a specified number of pieces of coding information starting from the coding information that is entered earliest or a method of referring to a specified number of pieces of coding information starting from the coding information that is entered latest may be used.

For candidates among the coding information buffers to be referred to (hereinafter, referred to as coding information buffer candidates), priorities may be set differently from other candidates. For example, when spatial candidates, temporal candidates, and coding information buffer candidates exist and these candidates are prioritized in order of searching, at least one of the following methods may be utilized: preferentially searching for coding information buffer candidates; preferentially searching for spatial candidates and temporal candidates and then searching for coding information buffer candidates; and preferentially searching for spatial candidates, then searching for coding information buffer candidates, and finally searching for temporal candidates.

In this case, all the blocks belonging to a corresponding block line or all the blocks disposed at the top boundary of a block line are the blocks that are to be processed by referring to the coding information buffer candidate. Alternatively, a part of the blocks may be the blocks that are to be processed by referring to the coding information buffer candidate.

Hereinafter, a method of excluding or deleting the coding information that is duplicated with the coding information stored in the coding information buffer will be described.

When new coding information is input to the coding information buffer, the encoder/decoder may compare the new coding information with all the pieces of the coding information stored in the coding information buffers. When the coding information which is identical to the new coding information is present in the coding information buffer, the new coding information may not be recorded in the coding information buffer.

Figure 14:
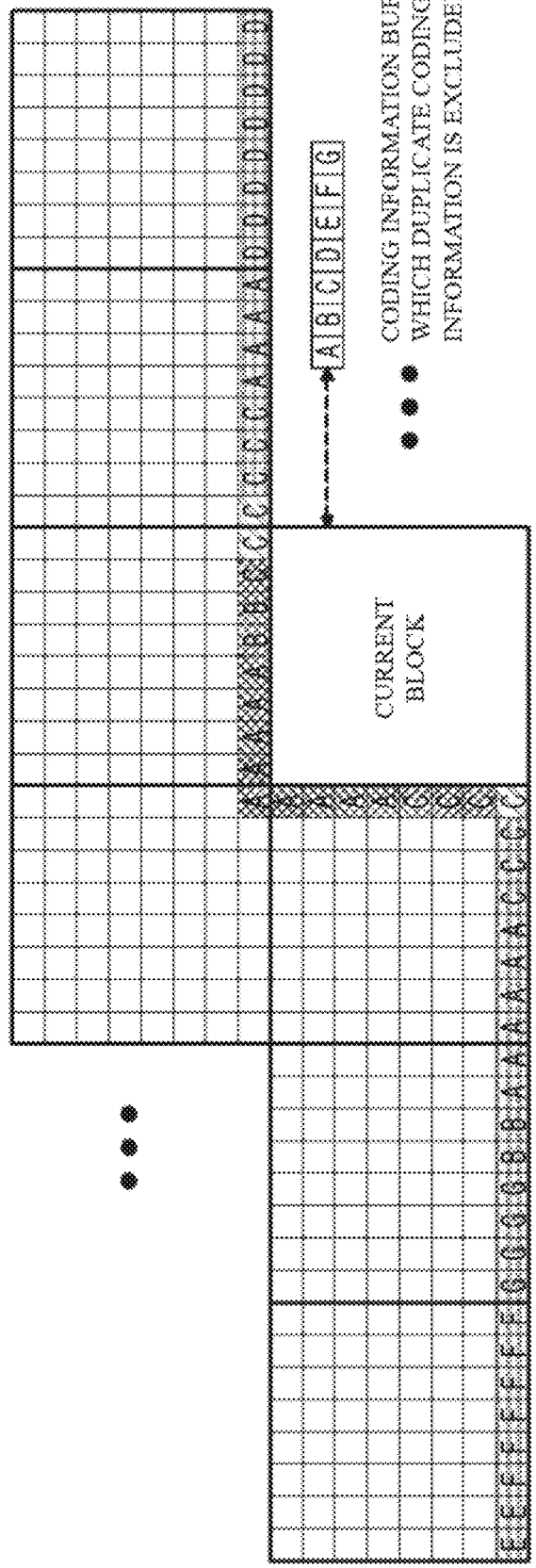
FIG. 14 is a diagram illustrating a coding information buffer according to a further embodiment of the present invention.

FIG. 14 is a diagram illustrating a coding information buffer according to a further embodiment of the present invention.

The uppercase alphabet, shown in FIG. 14, may denote coding information on each block. FIG. 14 illustrates a case where there is a very high redundancy among pieces of coding information. This may be because the coding information occurs in groups of sub-blocks when the current block is encoded/decoded.

FIG. 14 shows a case where the coding information buffer can contain only seven pieces of coding information. In this case, the encoder/decoder may record multiple pieces of coding information in the coding information buffer in order of high frequency of occurrence of the coding information that is found around the current block. In this case, an index value for the coding information increases according to the order in which the coding information is recorded, and more frequently occurring coding information may have a lower index value. In other words, the lower the index value, the less the information required for signaling.

In another example, the encoder/decoder may compare new piece of coding information with only some pieces of coding information of adjacent areas among multiple pieces of coding information stored in the coding information buffer. When the coding information of an adjacent area and the new coding information are the same, the new coding information may not be recorded in the coding information buffer.

Figure 15:
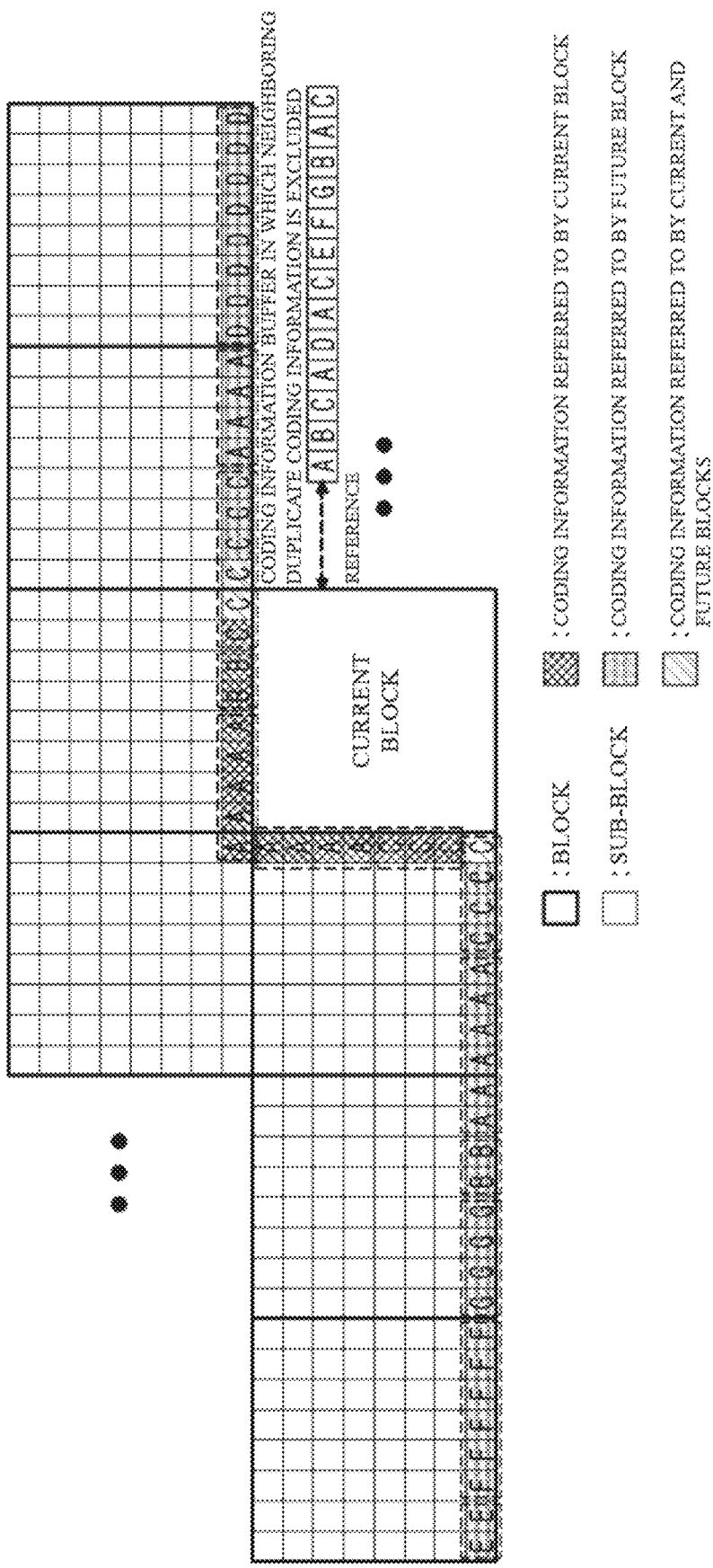
FIG. 15 is a diagram illustrating a coding information buffer according to a yet further embodiment of the present invention.

FIG. 15 is a diagram illustrating a coding information buffer according to a yet further embodiment of the present invention.

When multiple pieces of coding information are recorded in the coding information buffer according to a predetermined order, whether there is redundancy among the multiple pieces of coding information is determined in an order in which the multiple pieces of coding information are recorded. For example, when the coding information of a sub-block row adjacent to the top boundary of the current block is recorded sequentially in the coding information buffer, the most recently recorded coding information may be the closest coding information to the new coding information that is currently checked for redundancy.

Therefore, the operation of determining redundancy can be simplified by comparing only the most recently recorded information in the coding information buffer with new coding information. According to the embodiment in FIG. 15, when new coding information recorded in the coding information buffer is identical to old coding information stored in the coding information buffer and a distance between the new coding information and the old coding information is excessively long, it is preferable that the new coding information is not excluded from the coding information buffer.

FIG. 15 shows a coding information buffer in which duplicate coding information is not completely excluded, unlike the embodiment in FIG. 14. According to the embodiment in FIG. 15, when new coding information is duplicated with coding information of an adjacent area, only one piece of coding information of the two pieces of coding information that are duplicated may be stored in the coding information buffer. An area demarcated with a dotted area shows a process of eliminating redundancy of each piece of coding information, considering the order in which the multiple pieces of coding information are stored in the coding information buffer. Since each dotted area contains the same coding information, one piece of coding information for each dotted area is recorded sequentially into the coding information buffer.

Alternatively, the encoding/decoder may prevent new coding information from being recorded into the coding information buffer when the new coding information is similar to old coding information stored in the coding information buffer.

According to this embodiment, there may be a problem that prediction efficiency is reduced because the variety of coding information that can be used for prediction is reduced. On the other hand, there are advantages that the number of pieces of coding information stored is reduced and the size of the buffer used is reduced. In other words, there is an advantage that the consumption of a memory space of the coding information buffer is reduced.

As another example, when the encoder/decoder adds a new piece of coding information to the coding information buffer, the location of the block for which the new piece of coding information is generated may be considered.

In the description herein, the location of each unit for which the coding information is generated is referred to as a coding information generation position. When coding information generation positions are too close, the density of the coding information stored in the coding information buffer may not be uniform.

For example, when a subblock-based encoding/decoding method is not used, since the coding information of the subblocks belonging to one block is the same, a reference area of the subblocks within one block may have the same coding information.

When the coding information redundancy exclusion is used, redundancy of the duplicate coding information can be eliminated, and only non-duplicate information may be stored in the coding information buffer. In the case of partitioning into large blocks, the probability that the same block will be referenced during encoding/decoding increases. In this case, a small number of pieces of coding information may be stored in the coding information buffer. On the other hand, in the case of partitioning into small blocks, the probability that different blocks will be referenced during encoding/decoding increases. In this case, a relatively large number of pieces of coding information may be stored in the encoding/decoding information buffer. Thus, the coding information buffer stores a relatively large number of pieces of coding information when relatively small blocks are generated through partitioning and a relatively small number of pieces of coding information when relatively large blocks are generated through partitioning.

According to this embodiment, when the encoder/decoder stores the coding information, the encoder/decoder may store one piece of coding information at a certain interval to prevent the coding information of a specific location from excessively densely generated.

In another example, the encoder/decoder may add new coding information to the coding information buffer, taking into account the partition type of the block at which the new coding information is generated.

Only the coding information for one subblock contained in a particular block may be stored in the coding information buffer, or the average value of the coding information of the subblocks may be stored in the coding information buffer, depending on the partition type of the block.

In addition, when the subblock-based prediction method is not applied, since the coding information for each sub-block in a particular block is not different from each other, only one piece of coding information may be stored for the particular block.

Figure 16:
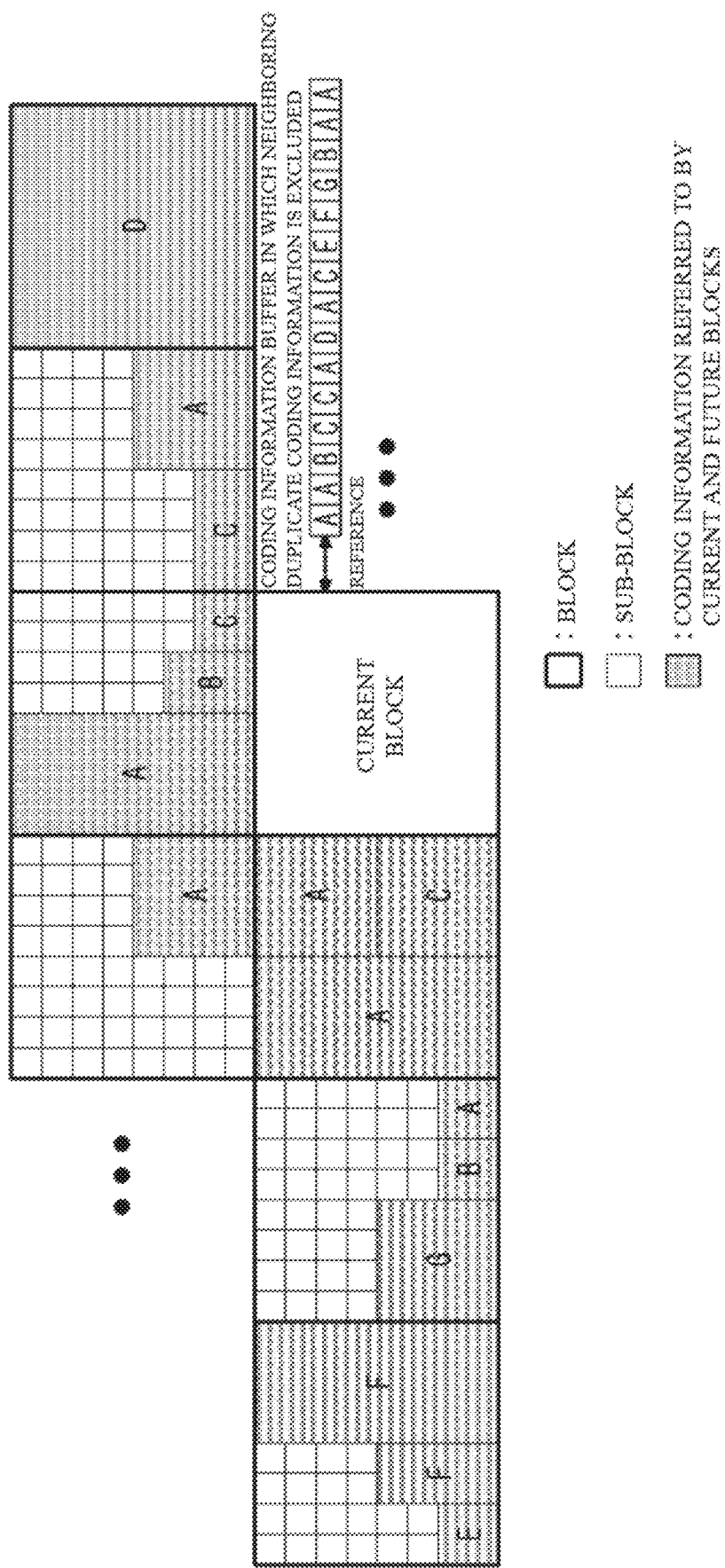
FIG. 16 is a diagram illustrating a coding information buffer according to a yet further embodiment of the present invention.

FIG. 16 is a diagram illustrating a coding information buffer according to a yet further embodiment of the present invention.

FIG. 16 shows an example in which the encoder/decoder excludes redundant coding information while taking into account the partition type of a block. Since subblocks in one block have the same coding information, one piece of coding information may be stored in the coding information buffer per block corresponding to an area which will be referenced by the current or future block.

In another example, the encoder/decoder can exclude redundant coding information by using a coding information index buffer indicating coding information corresponding to a coding information buffer derived using at least one of the examples described above.

The coding information buffer according to this example may be represented as a set of indexes that indicate specific motion information. The coding information index buffer may be configured to have the same size as the coding information buffer to which exclusion of the redundant coding information is not applied. The coding information index buffer may provide a determination criterion that which coding information is indicated by index information stored in the coding information buffer to which the exclusion of redundant coding information is applied. Since index information is smaller than normal coding information in terms of the size of memory to store the information, memory usage can be reduced when the index is used to store the coding information.

Figure 17:
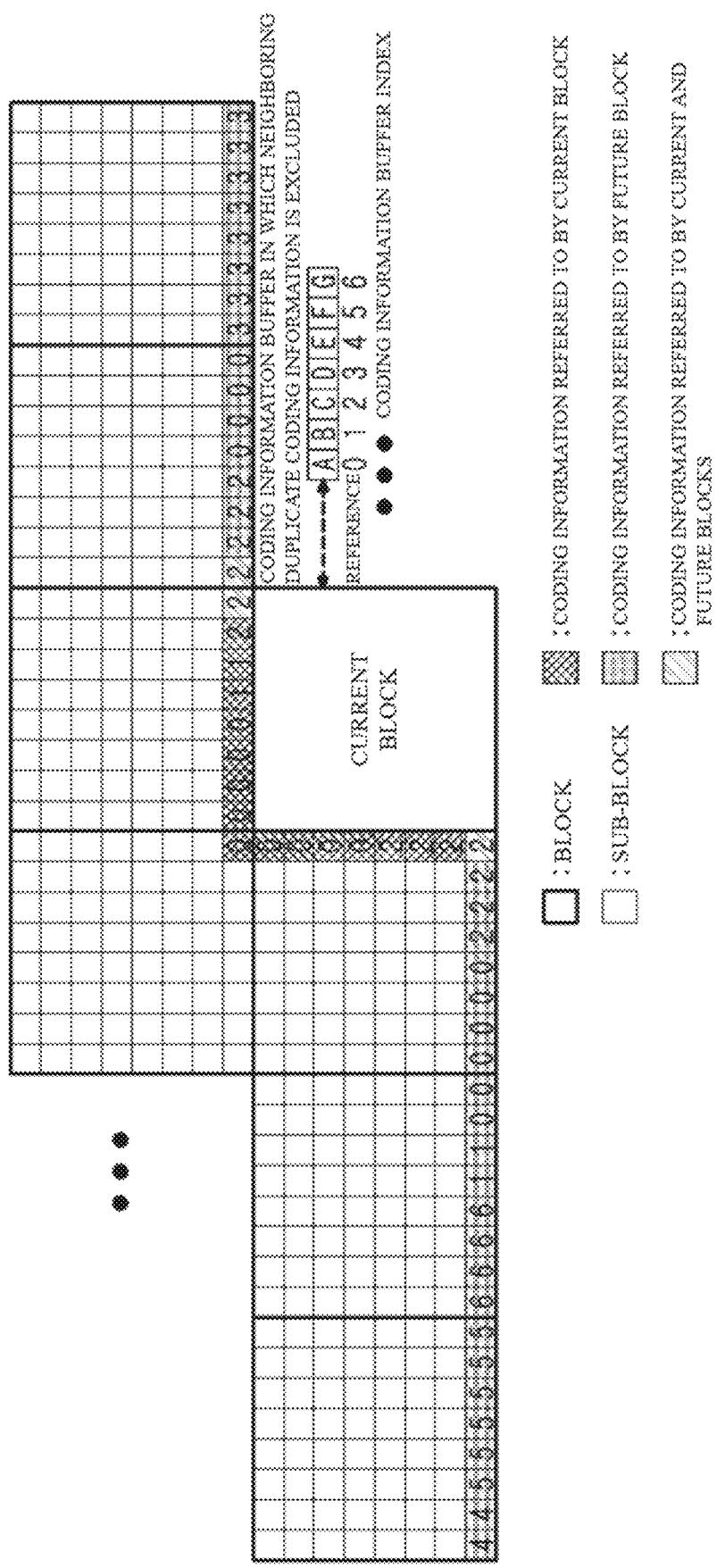
FIG. 17 is a diagram illustrating a coding information buffer according to a yet further embodiment of the present invention.

FIG. 17 is a diagram illustrating a coding information buffer according to a yet further embodiment of the present invention.

FIG. 17 shows an example in which the buffer index to the example in FIG. 12 is used. A separate index buffer may be used for ease of reference of the coding information buffer and clarity of location of reference. The size of the coding information index buffer is the same as the size of the coding information buffer in FIG. 12, but the information stored may be the index information corresponding to the coding information. Since each piece of index information uses less memory than each piece of coding information, the total size of the coding information buffer and the coding information index buffer may be smaller than the size of the coding information buffer illustrated in FIG. 12.

Hereinafter, a method of limiting the size of the coding information buffer will be described.

When using a coding information buffer, in the case where exclusion of redundancy of coding information is applied, the of the coding information buffer may vary.

On the other hand, there are cases where the size of a memory is not variable in a hardware configuration. Therefore, a memory needs to be implemented in consideration of cases where buffers are consumed in their maximum. When the maximum number of pieces of coding information are stored in the coding information buffer to which the coding information redundancy exclusion scheme is applied, the size of the coding information buffer may be equal to the size of the coding information buffer to which the coding information redundancy exclusion scheme is not applied. In consideration of this case, the memory device must be configured with the same size of memory. Therefore, the maximum memory size to be used can be adjusted by limiting the maximum size of the coding information buffer in advance. In other words, the size of the coding information buffer according to the invention can be preset.

Hereinafter, a method of eliminating at least one piece of coding information among pieces of coding information stored in the coding information buffer will be described.

The encoder/decoder can reduce the size of the buffer being used by eliminating the coding information that is stored in the coding information buffer and which is no longer used.

For example, the encoder/decoder may determine which information should be deleted on the basis of the coding information generation position in the process of adding the coding information to the buffer.

An additional memory device may be used to store the coding information generation position, but overall memory usage can be reduced by reducing the number of pieces of coding information stored in the coding information buffer.

In this case, the stored coding information generation position may be inferred and used. For example, when the coding information of each of the subblocks of a subblock row in contact with the upper end of the current block is stored sequentially in the coding information buffer, since the y-axis position of the coding information of each of the subblocks is the same, only the x-axis information may be stored as the position information of the coding information.

In addition, the position of the coding information may be inferred by fixing the order or position of the coding information entered into the coding information buffer. The stored or inferred position information of the coding information may be used when referring to the code buffer to encode/decode the current block. When a method of excluding duplicate coding information is applied, the encoding/decoding of the current block may be performed by referring to the coding information of a reference position or a position close to the reference position on the basis of the stored or inferred position information.

For example, when the coding information is sequentially entered into the sequence of occurrence in the coding information buffer, first-input coding information that is entered earliest may be the coding information that occurred at a location that is far from the current block or the coding information that is no longer used in prediction. Therefore, when the size of the coding information buffer is limited, the coding information that is input earliest is deleted, thereby reducing the memory consumption by the coding information buffer while minimizing the reduction of the coding efficiency.

Figure 18:
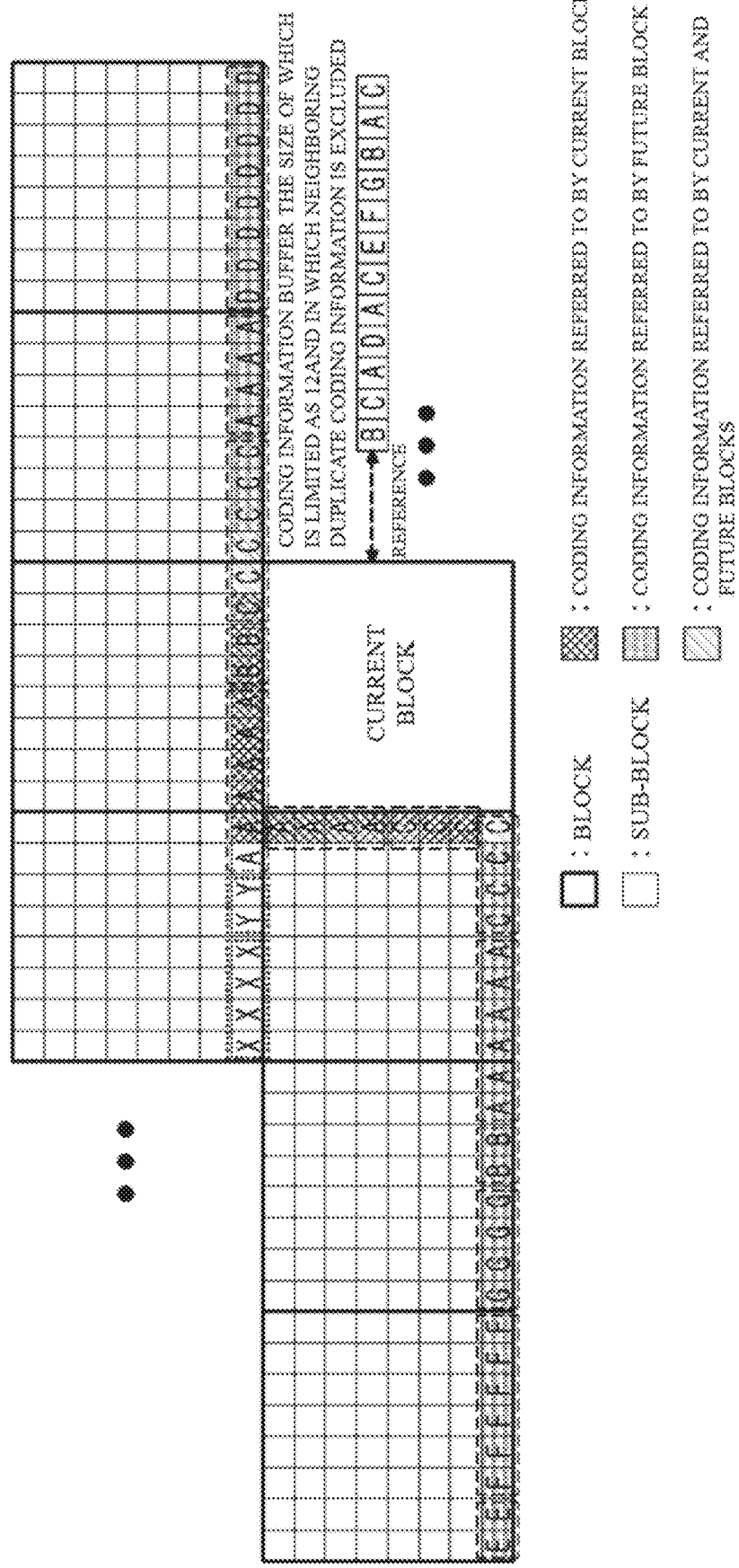
FIG. 18 is a diagram illustrating a coding information buffer according to a yet further embodiment of the present invention.

FIG. 18 is a diagram illustrating a coding information buffer according to a yet further embodiment of the present invention.

The example in FIG. 18 shows a case where X and Y that are the coding information of positions which are not referred to by the current block are considered. In FIG. 18, a coding information group including the coding information X, the coding information Y, and coding information A that occurs in an area that is not referred to by the current block may be stored in an existing coding information buffer. In this case, when new coding information occurs while the size of the coding information buffer is limited to 12, first-input coding information may be preferentially excluded. In other words, the coding information X, the coding information Y, and the coding information A that are entered earliest may be excluded.

In this case, information that is less likely to be referred to can be excluded preferentially. However, this case has a problem that coding information (for example, coding information) that can be referred to by the current block also can be excluded. Therefore, it is necessary to select the appropriate size of the coding information buffer.

For example, the present size of the coding information buffer may be a positive integer. Specifically, the preset size of the coding information buffer may be 5.

Hereinafter, a method of encoding/decoding a current block using a coding information buffer to which the duplicate coding information exclusion scheme is applied will be described.

For example, the encoder/decoder may encode/decode the current block by using a coding information generation position. When the coding information generation position is not stored in the coding information buffer or the coding information generation position is not explicitly stored in the coding information buffer, the encoder/decoder may infer or derive the coding information generation position and search the coding information buffer for coding information corresponding to a reference position. Also, even when the coding information of a search position is not stored in the coding information buffer, the same coding information can be derived by using the coding information generation position information stored in the coding information buffer.

As another example, all the pieces of coding information stored in the coding information buffer may be used as reference candidates unlike a method in which only some pieces of coding information stored at specified positions in the coding information buffer are used as reference candidates.

When the duplicate coding information exclusion scheme is applied, the size of the coding information buffer is reduced, and redundancy is excluded. Therefore, although the entire area of the coding information buffer is searched, the operational efficiency is not reduced. Depending on the size of the coding information buffer, more reference candidates can be generated. Therefore, the coding efficiency is increased.

In another example, the encoder/decoder considers the order in which the coding information is entered into the coding information buffer and searches for a specific piece of coding information, starting from the coding information entered earliest or latest. Depending on the direction of searching, a specified number of pieces of coding information may be referred to.

This method is used in a case where the size of the coding information buffer is limited, and the coding information is gradually removed. Therefore, coding information stored and continuously changing in the coding information buffer can be used for encoding/decoding. For example, when the coding information buffer has a first-in-first-out (FIFO) structure, the first-input coding information is preferentially referred to and then removed from the coding information buffer. Therefore, it is possible to refer to continuously changing candidates.

The coding information in the coding information buffer to which the above-described method is applied may be used as reference candidates for the current or future block. In this case, information indicating a reference candidate may be signaled so that the encoder and the decoder can refer to the same candidate.

For example, an index that indicates the coding information to be referred to may be signaled from the encoder to the decoder. Here the index may indicate one of the candidates included in the coding information buffer.

This method is a method of using all the pieces of coding information stored in the coding information buffer as reference candidates for encoding and decoding. In this case, the order of the pieces of coding information in the coding information buffer may be restored. When the order of the pieces of coding information is resorted, the encoder may signal the index corresponding to the restored order to the decoder.

Alternatively, indexes indicating some pieces of coding information in a list of candidates selected or derived from the coding information buffer may be signaled from the encoder to the decoder.

This method is a method of using only selected pieces of coding information among all the pieces of coding information stored in the coding information buffer as reference candidates for encoding and decoding. The encoding/decoder may construct a new candidate list with a selection of pieces of coding information selected according to a predetermined method and identify the selected pieces of coding information by indexing the candidate list. In this case, the candidate selection is performed according to at least one of the following options: AMVP mode, merge mode, or IBC mode.

For example, the encoder/decoder may create a list of candidates for encoding/decoding of the current or future block, with some pieces of coding information stored in the coding information buffer. In this case, the list of candidates that is created may be a merge candidate list or a motion vector candidate list.

FIG. 18 is a diagram illustrating a syntax structure according to a yet further embodiment of the present invention.

Signaling for coding information buffer referencing refers to a process of sending a signal required when encoding/decoding is performed using some or all the pieces of coding information stored in the coding information buffer as reference candidates. The syntax in FIG. 19 may be used to signal the index of a candidate used for prediction when a candidate list is generated using some or all the pieces of coding information stored in the coding information buffer.

Referring to FIG. 19, an intra-prediction mode and an inter-prediction mode are used for the encoding and signaling of coding information buffer referencing is performed according to each encoding mode. This may be because the coding information buffer is configured separately depending on the encoding method.

In addition, although the coding information buffer is the same, the candidate list composed candidates selected from among the pieces of coding information stored in the coding information buffer can be configured separately depending on the prediction mode. For example, when an intra-prediction mode is applied to the current block, the candidate list may be constructed using only the coding information having an intra-prediction mode as a prediction mode among the pieces of coding information stored in the coding information buffer. In addition, when an inter-prediction mode is applied to the current block, the candidate list may be constructed using only the coding information having an inter-prediction mode as a prediction mode among the pieces of coding information stored in the coding information buffer. In this case, the creation method and size of the candidate list may be set differently depending on the encoding mode.

For example, an indicator (pred_intra_mode_type_idx) that indicates an intra-prediction mode type may be a syntax used when an intra-prediction mode is applied to the current block and there are multiple available intra-prediction modes. In addition, the pred_intra_mode_type_idx may be an indicator (index) to indicate or distinguish which intra-prediction mode is used among multiple intra-prediction modes. In this case, the pred_intra_mode_type_idx may not be signaled when there is one or no available intra-prediction mode.

The value of the pred_intra_mode_type_idx may be set to MODE_INTRA_PRED_BUFER when the current block uses a prediction method that refers to a coding information buffer. The MODE_INTRA_PRED_BUFFER may be a delimiter that refers to an intra-prediction mode in which prediction is performed by referring to the coding information buffer. When the value of pred_intra_mode_type_idx of the current block is set to MODE_INTRA_PRED_BUFER, it means that the current block is predicted using an intra-prediction method in which prediction is performed by referring to the coding information buffer. In this case, the coding information buffer may be a coding information buffer with no redundancy as described above or may be a list of cumulative coding information candidates described below.

The intra_pred_buffer_cand_idx may be signaled when pred_intra_mode_type_idx indicates a prediction method in which the current block is predicted by referring to the coding information buffer. The intra_pred_buffer_cand_idx may be a syntax that indicates which candidate among candidates in the coding information buffer or the candidate list is to be used.

An indicator (pred_inter_mode_type_idx) indicating the type of inter prediction mode may be a syntax used when an inter-prediction mode is applied to the current block and there are multiple available intra prediction modes. In addition, the pred_inter_mode_type_idx may be an indicator (index) to indicate or distinguish which inter-prediction mode among multiple inter-prediction modes is to be used. In this case, the pred_inter_mode_type_idx may not be signaled when there is no or only one available inter-prediction mode.

The value of the pred_inter_mode_type_idx may be set to MODE_INTER_PRED_BUFER when the current block is predicted by referring to the coding information buffer. The MODE_INTER_PRED_BUFFER may be a delimiter that refers to an inter-prediction mode in which prediction is performed by referring to the coding information buffer. When the value of the pred_inter_mode_type_idx of the current block is set to the MODE_INTER_PRED_BUFER, it may mean that the current block is predicted using an inter-prediction method in which the coding information buffer is referred to. In this case, the coding information buffer may be a coding information buffer that excludes duplicate coding information as described above or a cumulative list of coding information candidates (hereinafter, referred to as cumulative coding information candidate list) described below.

Hereinafter, a method of replacing the coding information buffer with the cumulative coding information candidate list.

According to one embodiment of the invention, the encoder/decoder may perform encoding/decoding using the cumulative coding information candidate list. The cumulative coding information candidate list also can be referred to as a history-based candidate list or a cumulative candidate list.

The cumulative coding information candidate list may mean a list that cumulatively includes the coding information that occurred in each of the preceding blocks to the current block in order of encoding/decoding. The cumulative coding information candidate list is used in the process of encoding. It means that the current or future block is predicted by referring to the cumulative coding information candidate list generated during encoding and decoding. Hereinafter, candidates that can be included in the cumulative coding information candidate list will be referred to as cumulative coding Information candidates.

For example, the cumulative coding information candidate list may be differently constructed depending on the encoded/decoding method. For example, a cumulative list of coding information candidates for motion information is generated in the case of inter-prediction mode, and a cumulative list of coding information candidates for prediction mode numbers may be generated in the case of the intra-prediction mode.

The cumulative coding information candidate list may be maintained during the encoding/decoding of a specified range or area. For example, when the cumulative coding information candidate list is stored on a per picture basis, the cumulative coding information candidate list can store the coding information generated within a picture.

In addition, the size of the cumulative coding information candidate list may be limited. When the cumulative coding information candidate list having a limited size is filled with coding information candidates, the stored coding information candidates may be deleted, and new coding information candidates may be added. Alternatively, new coding information candidates may not be added. In this case, the limited size of the cumulative coding information candidate list may be preset. The size may be preset in a manner of signaling a value from the encoder to the decoder or in a manner of being determined to be a value set in the encoder/decoder. Here, the value may be a positive integer. For example, the limited size of the cumulative coding information candidate list may be a value of 5.

For example, when the coding information candidates stored in the cumulative coding information candidate list are deleted, at least one of the following options may be used: first-in first-out scheme in which first-entered coding information is first deleted; and redundancy elimination scheme in which redundant coding information is eliminated when two or more pieces of coding information are identical and new coding information is added.

For example, according to the first-in first-out scheme in which first-entered coding information is deleted, the encoder/decoder deletes the coding information that is inserted first into the cumulative coding information candidate list and inserts new coding information into the next position to the coding information that is inserted last into the candidate list.

In another example, when new coding information is not stored and the cumulative coding information candidate list is full of coding information, one of the following options may be used: no coding information is added any longer; and only duplicate coding information is not added.

In addition, the cumulative coding information candidate list can be updated by using a method of deleting the coding information stored in the cumulative coding information candidate list, a method of not storing new coding information, or both.

The cumulative coding information candidate list can be managed such that previously generated coding information candidates can be stored, similarly to the management of the coding information buffer. However, the cumulative coding information candidate list may be managed only considering the size of or redundancy in the cumulative coding information candidate list, regardless of where or when the coding information is generated. The candidates included in the cumulative coding information candidate list can be used as reference candidates during the encoding/decoding process.

On the other hand, the coding information buffer selectively stores only the coding information that may be referenced by the current or future block, or any coding information that may be referenced by the current or future block. Since the cumulative coding information candidate list and the coding information buffer are similar in terms of the use of stored coding information, the coding information buffer can be replaced with the cumulative coding information candidate list in the encoder/decoder that uses the cumulative coding information candidate list. In this case, due to the difference between the cumulative coding information candidate list and the coding information buffer, the coding information to be referred to at the time of encoding/encoding may vary. However, since no separate coding information buffer is used, memory usage can be significantly reduced.

For example, only the coding information that is generated in a specific area (partial area) can be stored in the cumulative coding information candidate list. For example, the coding information that is generated in at least one of the following areas within a picture can be stored in the cumulative coding information candidate list: all areas which have been encoded/decoded; slices; tiles; an area ranging from a CTU positioned above a current CTU in which a current block is included to a CTU that immediately precedes the current CTU; an area corresponding to a row of CTUs positioned above the current CTU in which the current block is included; an area composed of blocks positioned at the bottom of the CTU row positioned above the current CTU in which the current block is included; an area of a row of CTUs including the current CTU in which the current block is included; an area of a column of CTUs including the current CTU in which the current block is included; and an area of at least one boundary of each CTU.

In other words, the cumulative coding information candidate list may be created or managed in units of any one of the above-described areas. When the current block is located outside the area where the cumulative coding information candidate list is managed, the coding information of the current block may not be stored in the cumulative coding information candidate list. In addition, when a new area is encoded/decoded, the cumulative coding information candidate list for the previous area may be initialized. The coding information of the new area may be added sequentially to the initialized cumulative coding information candidate list.

FIG. 19 is a diagram illustrating a region in which coding information is to be stored, according one embodiment of the present invention.

Figure 20:
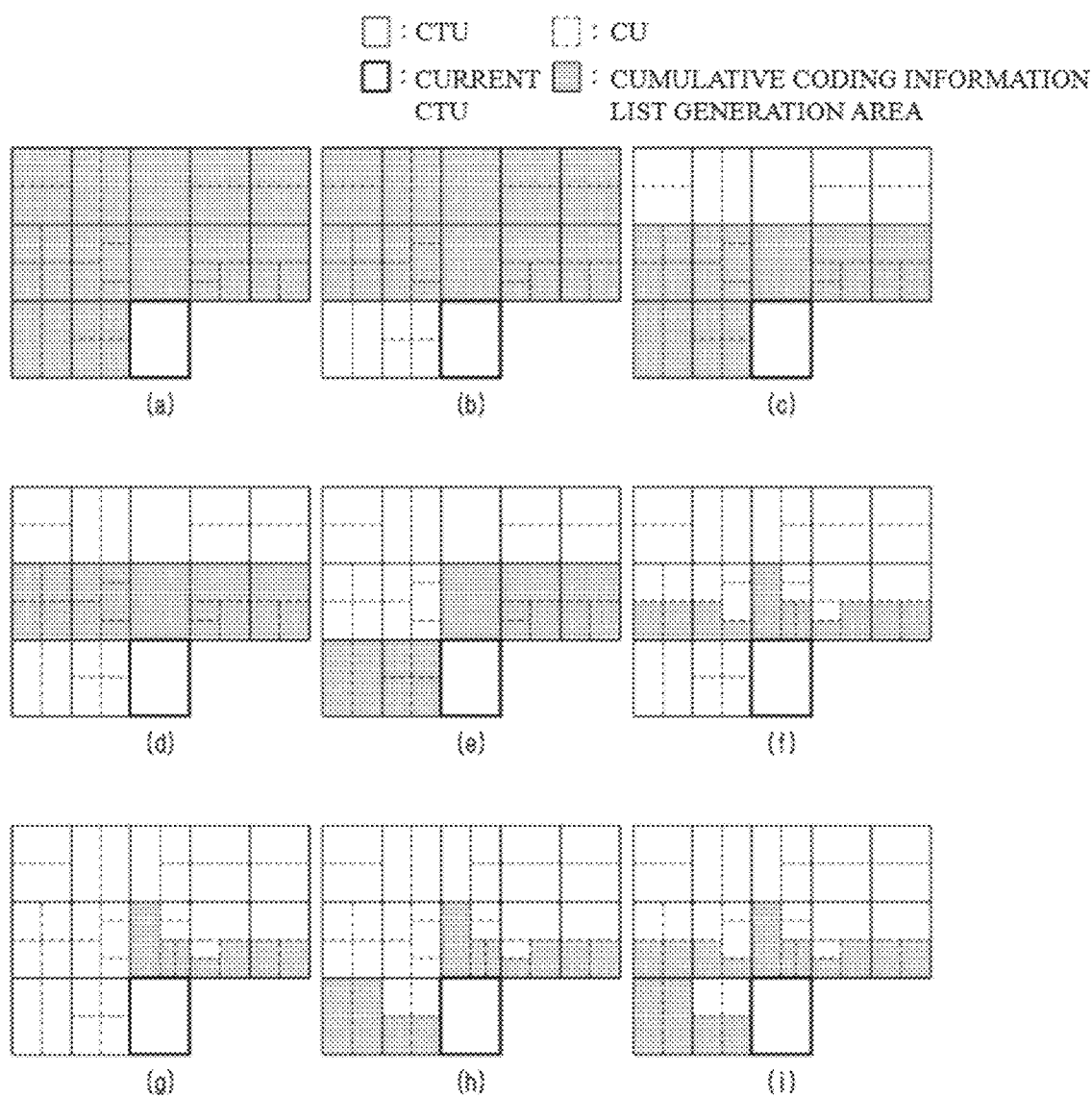
FIG. 20 is a diagram illustrating a region in which coding information is to be stored, according one embodiment of the present invention.

FIG. 20 illustrates some examples in which a partial area is defined, and only coding information generated from a specific area is stored in a cumulative coding information candidate list. FIG. 20 illustrates an example of a picture in which previously reconstructed CTUs exist and the previously reconstructed CTUs are partitioned into CUs. Referring to FIG. 20, in this case, the areas for each of which coding information is stored are differently set when constructing a cumulative encoded information candidate list.

Hereinafter, a cumulative coding information candidate list generation area refers to an area from which coding information to be used to construct a cumulative coding information candidate list is generated. In addition, the cumulative coding information candidate list generation area also means an area for which the cumulative coding information candidate list is managed. The coding information generated from the cumulative coding information candidate list generation area is entirely or partially stored in the cumulative coding information candidate list. The coding information stored in the cumulative coding information candidate list can be deleted.

For example, in the example in FIG. 20(a), the coding information generated from all the previously reconstructed CTUs preceding to the current CTU may be stored in the cumulative coding information candidate list.

In the example in FIG. 20(b), the coding information generated from a CTU row located above the current CTU may be stored in the cumulative coding information candidate list.

In the example in FIG. 20(c), the coding information generated from an area corresponding to a CTU row on the upper side of the current CTU and the coding information generated from an area ranging from the beginning CTU to the immediately preceding CTU of the current CTU in a current CTU row in which the current CTU is included may be stored in the cumulative coding information candidate list.

In the example in FIG. 20(d), the coding information generated from a CTU row on the upper side of the current CTU may be stored in the cumulative coding information candidate list.

In the example in FIG. 20(e), the coding information from an area ranging from the beginning CTU of a CTU row on the upper side of the current CTU to the immediately preceding CTU to the current CTU in terms of order of encoding/decoding may be stored in the cumulative coding information candidate list.

In the examples illustrated in FIG. 20(f) through (i), coding information from each of the CUs may be stored in the cumulative coding information candidate list instead of each of the CTUs.

In the example in FIG. 20(f), the coding information generated from CUs located immediately above the boundary between a current CTU row in which the current CTU is included and an upper CTU row located immediately above the current CTU row (i.e., coding information generated from CUs adjacent to the bottom boundary of the upper CTU row) may be stored in the cumulative coding information candidate list.

In the example in FIG. 20(g), the coding information generated from all the CUs adjacent to the bottom boundary within the upper CTU row of the current CTU may be stored in the cumulative coding information candidate list.

On the other hand, only part of the coding information generated from the CUs adjacent to the bottom boundary in the upper CTU row may be stored in the cumulative coding information candidate list. On the other hand, the coding information of a block including pixels ranging from the first pixel to the N-th pixel when counted from the left end of the picture, among the pixels located at the bottom of the upper CTU row on the upper side of the current CTU, may be stored in the cumulative coding information candidate list. In this case, the N may be one of 4, 8, 16, 32, 64, and 128.

Similarly, for all the examples in FIG. 20, only part of the coding information of each of the areas according to the respective examples may be stored in the cumulative coding information candidate list. In addition, the encoder/decoder may subsample the coding information of the blocks corresponding to part of the coding information (i.e. the M-th coding information or the coding information containing the position of the M-th pixel) and store the subsampled coding information in the cumulative coding information candidate list. In this case, the M may be an integer greater than 1.

In the example in FIG. 20(g), among the CUs adjacent to the boundary between the current CTU row in which the current CTU is included and the upper CTU row of the current CTU, coding information generated from an area of the CUs belonging to the upper CTU of the current CTU and the subsequent CTU to the current CTU in order of encoding is stored in the cumulative coding information candidate list.

In the example in FIG. 20(h), in addition to the area proposed in the example of FIG. 20 (g), coding information generated from an area of CUs that belong to the current CTU row and which are adjacent to the boundary between the current CTU row and a lower CTU row is stored in the cumulative coding information candidate list.

In the example in FIG. 20(i), the coding information generated from an area of the CUs located adjacent to and located directly above the boundary between the current CTU row and the upper CTU row and the boundary between the current CTU row and the lower CTU row is stored in the cumulative coding information candidate list.

In addition to the examples in FIGS. 20(a) through 20(i), various cumulative coding information candidate list generation areas can be defined. For example, the coding information generated from an area of the CUs in the current CTU row in which the current block is included may be stored in the cumulative coding information candidate list.

When the current block is not included in the cumulative coding information candidate list generation area, the coding information generated from the current block may not be added to the cumulative coding information candidate list.

In addition, when there is reconstructed coding information of a CU included in the current CTU or the current CTU row, the reconstructed coding information of the CU may also be inserted into the cumulative coding information candidate list. In other words, the area of the reconstructed CU included in the current CTU may also be included in the generation area.

In another example, the coding information of a representative location in a CTU, such as the upper left or the center of the CTU, is set as representative coding information, and one piece of coding information per CTU may be stored in the cumulative coding information candidate list.

When a cumulative coding information candidate list is used instead of a coding information buffer, the way the current block refers to the coding information may vary. Since the coding information buffer is not used, there may be case where the current block cannot refer to the coding information of a specific location. The cumulative coding information candidate list may not have the location information for the generated coding information. Also, depending on the preset size of the cumulative coding information candidate list or on redundancy with the previously entered coding information, the coding information in the cumulative coding information candidate list may be deleted or new coding information may not be added to the cumulative coding information candidate list. In other words, unlike the coding information stored in the coding information buffer, the coding information in the cumulative coding information candidate list does not guarantee that the coding information at a particular location is present in the cumulative coding information candidate list. Thus, location-based coding information may be replaced with the coding information that is present in the cumulative coding information candidate list.

On the other hand, the subblocks resulting from partitioning of a coding block may have the coding information, regardless of the coding information list. In this case, only at the boundary of a largest coding block that is not yet partitioned, the coding information that cannot be referred to may occur because the coding information buffer is deleted. Therefore, a method of replacing only the coding information candidates that can be referred to and which are present outside a largest coding block that is not partitioned with coding information stored in the cumulative coding information candidate list may be used.

There may be a case where an encoding/decoding method using a cumulative coding information candidate list is used as a candidate for other encoding/decoding methods. For example, in merge mode or AMVP mode, a spatial candidate and a temporal candidate can be used together with a candidate in a cumulative coding information candidate list. Here, spatial candidates may be coding information derived from blocks located at spatially adjacent specific positions, and temporal candidates may be coding information derived from blocks located temporarily adjacent specific positions. A cumulative coding information candidate list candidate refers to a reference candidate in a cumulative coding information candidate list.

In this case, merge mode or AMVP mode may use the coding information that is referred to by a specific position and the coding information that is referred to and is included in the cumulative coding information candidate list. Therefore, when the coding information that refers to a specific position is replaced with the coding information that is to be referred to and is included in the cumulative coding information candidate list, the coding information candidates may be duplicated.

For example, the encoder/decoder may update a merge candidate list or an AMVP candidate list by inserting at least one candidate among candidates within the cumulative coding information candidate list into the merge candidate list or an AMVP motion vector candidate list.

For example, the encoder/decoder may derive a list of candidates (i.e., candidate list) for encoding/decoding of the current block with at least one of the following candidates: spatial candidates derived from adjacent blocks of the current block; temporal candidates derived from temporal neighboring blocks of the current block; and cumulative coding information candidates included in the cumulative coding information candidate list.

In this case, the candidates in the candidate list may be inserted in order of a spatial candidate, a temporal candidate, and a candidate selected from the cumulative coding information candidate list. Although spatial candidates, temporal candidates, and cumulative coding information candidates are inserted into the candidate list, when the number of candidates in the candidate list is less than a predetermined value, the encoder/decoder may construct a candidate list by additionally inserting zero candidates and combined-list candidates to the existing candidate list.

In this case, a method of not using duplicate coding information candidates, a method of omitting a coding information candidate for a specific position that cannot be referred to due to the absence of a coding information buffer, or the like may be used.

In addition, in merge mode, i.e., when coding information candidates that are to be referred to have their priority, a method of changing the order of priorities of candidates may be used. For example, in merge mode, priorities of candidates are in order of a spatial merge candidate, a temporal merge candidate, and a coding information candidate in a coding information candidate list.

Since a specific spatial candidate among spatial candidates cannot be referred to due to the replacement of the coding information buffer, a case where the spatial candidate is replaced with the coding information selected from the cumulative coding information candidate list may occur. In this case, the spatial candidate may be replaced with a candidate selected from the cumulative coding information candidate list. In addition, the cumulative coding information list candidate has higher priority than the spatial candidate when the cumulative coding information list candidate replaces the spatial candidate. In this case, the priority order may be changed in order of a spatial candidate that can be referred to, a cumulative coding information candidate that replaces a spatial candidate that cannot be referred to, and a temporal candidate.

When the number of candidates to be replaced with cumulative coding Information candidates is less than the number of pieces of coding information stored in the cumulative coding information candidate list, a method of using coding information that is stored in a cumulative coding information candidate list but is not a cumulative coding information candidate to replace a candidate of a specific position as a cumulative coding information candidate may be used.

For example, when some of the spatial candidates cannot be referred to due to the removal of the coding information buffer, as many candidates as the number of spatial candidates that cannot be referred to may be selected for reference from the cumulative coding information candidate list. When the turn of a cumulative coding information candidate comes in the process in which candidates are generated according to a predetermined priority order, a cumulative coding information candidate may be generated by using coding information remaining in the cumulative coding information candidate list, except for the coding information treated previously as a spatial candidate.

Figure 21:
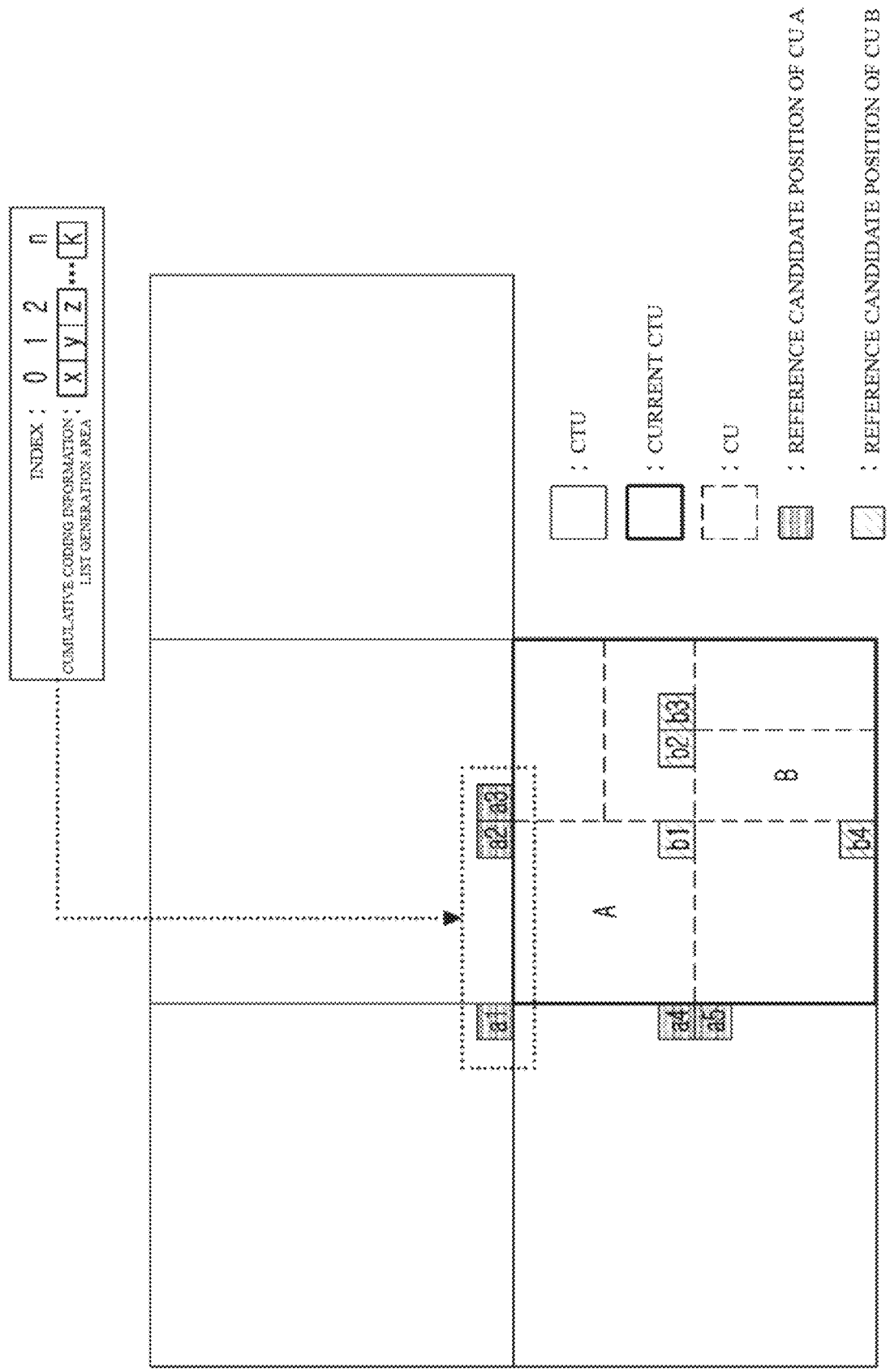
FIG. 21 is a diagram illustrating a method of referring to a list of candidates according to one embodiment of the present invention.

FIG. 21 is a diagram illustrating a method of referring to a list of candidates according to one embodiment of the present invention.

FIG. 21 shows an example of a method of replacing a coding information buffer with a cumulative coding information candidate list. In FIG. 21, a CTU is an example of an unpartitioned largest coding block, and a CU is an example of a child coding block resulting from partitioning of the CTU.

A coding information buffer may store coding information that can be used in both current and future blocks at a boundary of a current CTU. In FIG. 21, a CU A, which is one of the CUs of the current CTU, is located to be adjacent to the upper boundary of the current CTU. In this case, there may be a candidate position above the upper boundary of the current CTU.

Positions a1, a2, and a3 refer to the positions of spatial candidates adjacent to the upper boundary of the current CTU, and the coding information of each of the positions a1, a2, and a3 may be stored in the coding information buffer. Coding information of each of positions a4 and a5 may be stored in the coding information buffer or may be stored in a separate coding information buffer, depending on the configuration of the coding information buffers. In this case, the coding information buffer in which the coding information of each of the positions at the upper boundary of the current CTU is stored is referred to as an upper coding information buffer.

According to the example in FIG. 21, the coding information in the upper coding information buffer can be replaced with the coding information selected from the cumulative coding information candidate list. The encoder/decoder may refer to the cumulative coding information candidate list instead of using the upper coding information buffer. The encoding/decoder can save memory resources for the upper coding information buffer by not using the upper coding information buffer.

In this case, since the coding information generated in the current CTU is stored while having nothing to do with the coding information buffer, the coding information can be used in encoding/decoding of subsequent blocks. Thus, for the CUs (for example, a CU B) which are not in contact with the upper boundary of the CTU, a reference spatial coding information may not be replaced with a coding information candidate in a cumulative coding information candidate list.

The encoder/decoder may replace the spatial candidates located at the upper boundary of the CTU by using an arbitrary number of candidates, starting with a candidate at a position having a small index value in the cumulative coding information candidate list. According to the example in FIG. 21, when existing spatial candidates are preferentially searched for, the reference candidates of the CU A may become A4, a5, x, y, and z because a1, a2, and a3 are replaced with x, y, and z. On the other hand, the reference candidates of the CU B may become b1, b2, b3, b4, and b5.

In this case, the order of the spatial candidates may vary depending on the encoding or decoding method. For example, the order in which the candidates in the cumulative coding information candidate list are referred to may be an order in which the index value increases or an order in which the index value decreases. In addition to spatial candidates, there may be other kinds of candidates, such as temporal candidates, combined list candidates, and zero vector candidates. The order in which various kinds of candidates are arranged may vary.

In addition, the order in which candidates in the cumulative coding information candidate list are referred to may differ from the order in which other kinds of candidate are referred to. Depending on the order in which candidates are inserted into a candidate list, candidates with the same codification information may be excluded not to constitute the candidate list.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:
deriving a first candidate list for inter-prediction of a current block;
deriving motion information of the current block by using the first candidate list;
deriving a cumulative coding information candidate by using the motion information of the current block;
inserting the derived cumulative coding information candidate into a cumulative coding information candidate list; and
updating a second candidate list for a block with reference to the cumulative coding information candidate list,
wherein the updated second candidate list is used for inter-prediction of the block to be decoded after the current block,
wherein candidates included in the cumulative coding information candidate list are referenced in descending order of the cumulative candidate indexes of the candidates,
wherein the second candidate list is updated by using at least one of candidates of the cumulative coding information candidate list, and
wherein the at least one of candidates of the cumulative coding information candidate list is not duplicated to candidates of the second candidate list for inter-prediction.

2. The image decoding method according to claim 1, wherein the cumulative coding information candidate list contains motion information of a block that is previously decoded before the current block.

3. The image decoding method according to claim 2, wherein when the current block is not included in an area for which the cumulative coding information candidate list is generated, a cumulative coding information candidate derived by using the motion information of the current block is not inserted into the cumulative coding information candidate list.

4. The image decoding method according to claim 3, wherein the area for which the cumulative coding information candidate list is set on a per CTU row basis.

5. The image decoding method according to claim 1, wherein the number of candidates that can be inserted into the second candidate list is a preset value.

6. The image decoding method according to claim 5, wherein the inserting of the derived cumulative coding information candidate into the cumulative coding information candidate list comprises:
deleting the candidate that is inserted earliest into the cumulative coding information candidate list among candidates in the cumulative coding information candidate list, when the number of candidates in the second candidate list is the preset value; and
inserting the derived cumulative coding information candidate in a position next to a candidate that is inserted last into the cumulative coding information candidate list.

7. The image decoding method according to claim 1, wherein the updating of the second candidate list by using the cumulative coding information candidate list includes:
inserting at least one of the candidates included in the cumulative coding information candidate list into the second candidate list.

8. The image decoding method according to claim 7, wherein the candidates included in the cumulative coding information candidate list are inserted into the second candidate list after a spatial candidate or a temporal candidate is inserted into the second candidate list.

9. The image decoding method according to claim 1, wherein the second candidate list is at least one candidate list selected from among a merge candidate list and an AMVP motion vector candidate list.

10. An image encoding method comprising:
deriving a first candidate list for inter-prediction of a current block;
deriving a cumulative coding information candidate by using motion information of the current block;
inserting the derived cumulative coding information candidate into a cumulative coding information candidate list; and
updating a second candidate list for a block by referencing the cumulative coding information candidate list, and
wherein the updated second candidate list is used for inter-prediction of the block to be encoded after the current block,
wherein candidates included in the cumulative coding information candidate list are referenced in descending order of the cumulative candidate indexes of the candidates,
wherein the second candidate list is updated by using at least one of candidates of the cumulative coding information candidate list, and
wherein the at least one of candidates of the cumulative coding information candidate list is not duplicated to candidates of the second candidate list for inter-prediction.

11. The image encoding method according to claim 10, wherein the cumulative coding information candidate list contains motion information of a block that is previously encoded before the current block.

12. The image encoding method according to claim 11, wherein when the current block is not included in an area for which the cumulative coding information candidate list is generated, a cumulative coding information candidate derived by using the motion information of the current block is not inserted into the cumulative coding information candidate list.

13. The image encoding method according to claim 12, wherein the area for which the cumulative coding information candidate list is generated is set on a per CTU basis.

14. The image encoding method according to claim 10, wherein the number of candidates that can be inserted into the second candidate list is a preset value.

15. The image encoding method according to claim 14, wherein the inserting of the derived cumulative coding information candidate into the cumulative coding information candidate list includes:
deleting the candidate that is inserted earliest into the cumulative coding information candidate list among candidates in the cumulative coding information candidate list,
inserting the derived cumulative coding information candidate in a position next to a candidate that is inserted last into the cumulative coding information candidate list.

16. The image encoding method according to claim 10, wherein the deriving of the second candidate list by using the cumulative coding information candidate list includes:
inserting at least one of the candidates included in the cumulative coding information candidate list into the second candidate list.

17. The image encoding method according to claim 16, wherein the candidates in the cumulative coding information candidate list are inserted into the second candidate list after a spatial candidate or a temporal candidate is inserted into the second candidate list.

18. The image encoding method according to claim 10, wherein the second candidate list is either a merge candidate list or an AMVP motion vector candidate list.

19. A non-transitory computer-readable recording medium storing a bit stream generated by a video encoding method including:
deriving a first candidate list for inter-prediction of a current block;
deriving a cumulative coding information candidate by using motion information of the current block;
inserting the derived cumulative coding information candidate into a cumulative coding information candidate list; and
updating a second candidate list for a block by referencing the cumulative coding information candidate list, and
wherein the updated candidate list is used for inter-prediction of the block to be encoded after the current block,
wherein candidates included in the cumulative coding information candidate list are referenced in descending order of the cumulative candidate indexes of the candidates,
wherein the candidate list is updated by using at least one of candidates of the cumulative coding information candidate list, and
wherein the at least one of candidates of the cumulative coding information candidate list is not duplicated to candidates of the second candidate list for inter-prediction.

* * * * *